United States Patent
Sferrazza et al.

(10) Patent No.: US 11,847,105 B1
(45) Date of Patent: Dec. 19, 2023

(54) ASSOCIATION-RULE BASED DATA OUTLIER DETECTION AND RECORD COMPLETION SYSTEM AND METHOD

(71) Applicant: Meltwater News International Holdings GmbH, Schaffhausen (CH)

(72) Inventors: Stefano Sferrazza, Oxford (GB); Georg Gottlob, Oxford (GB); Giovanni Grasso, Oxford (GB); Aditya Jami, San Francisco, CA (US); Markus Kröll, Vienna (AT); Lukas Schweizer, Dresden (DE)

(73) Assignee: Meltwater News International Holdings GmbH, Schaffhausen (CH)

( * ) Notice: Subject to any disclaimer, the term of this patent is extended or adjusted under 35 U.S.C. 154(b) by 0 days.

(21) Appl. No.: 18/132,141

(22) Filed: Apr. 7, 2023

Related U.S. Application Data

(60) Provisional application No. 63/435,864, filed on Dec. 29, 2022.

(51) Int. Cl.
*G06F 16/00* (2019.01)
*G06F 16/215* (2019.01)
*G06F 16/2455* (2019.01)

(52) U.S. Cl.
CPC ...... *G06F 16/215* (2019.01); *G06F 16/24556* (2019.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 7,240,364 | B1 * | 7/2007 | Branscomb | H04L 61/4541 726/5 |
| 2006/0136462 | A1 * | 6/2006 | Campos | G06F 16/285 707/999.102 |
| 2007/0282827 | A1 * | 12/2007 | Levin | G06F 16/285 707/999.005 |
| 2015/0046351 | A1 * | 2/2015 | Tayebnejad | G06Q 30/0185 705/318 |
| 2017/0132429 | A1 * | 5/2017 | Bell | H04L 9/0891 |

OTHER PUBLICATIONS

Cai et al., "A portfolio of big data visualization system and method", Nov. 2018, Translation of the Foreign Application CN-108763253-A, 8 Pages (Year: 2018).*

* cited by examiner

*Primary Examiner* — Bai D Vu
(74) *Attorney, Agent, or Firm* — Fresh IP PLC; Clifford D. Hyra; John R. Bednarz

(57) ABSTRACT

The present disclosure comprises systems and methods to mine association rules from a dataset provided in the input. This comprises methodologies for optimizing the dataset for efficient computation of association rules, other than methodologies for handling partially true data. Moreover, it includes methodologies for evaluating the mining process automatically and removing uninteresting rules. In addition, it includes methodologies for integrating experts in the evaluation of the rules. Finally, methodologies to automatically detect outliers, correct outliers, update truth values and complete missing data in the original dataset. The overall methodology is completely automated and provides numerous tuning parameters to fit most of the use cases, including a default value for each of the tuning parameters to simplify its usage.

25 Claims, 6 Drawing Sheets

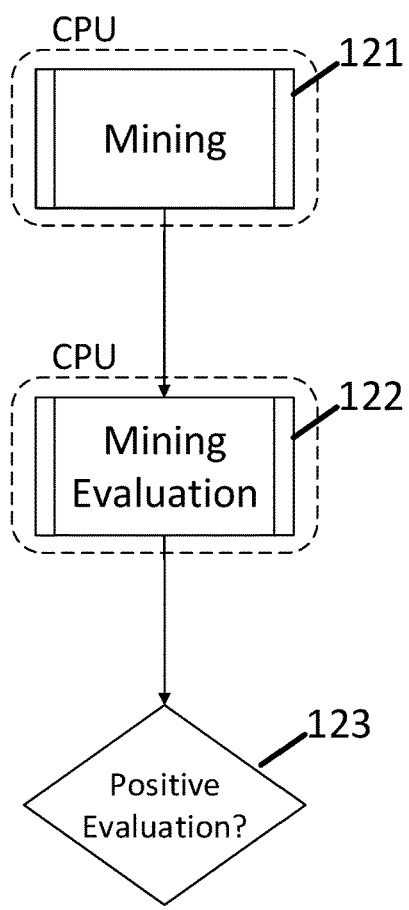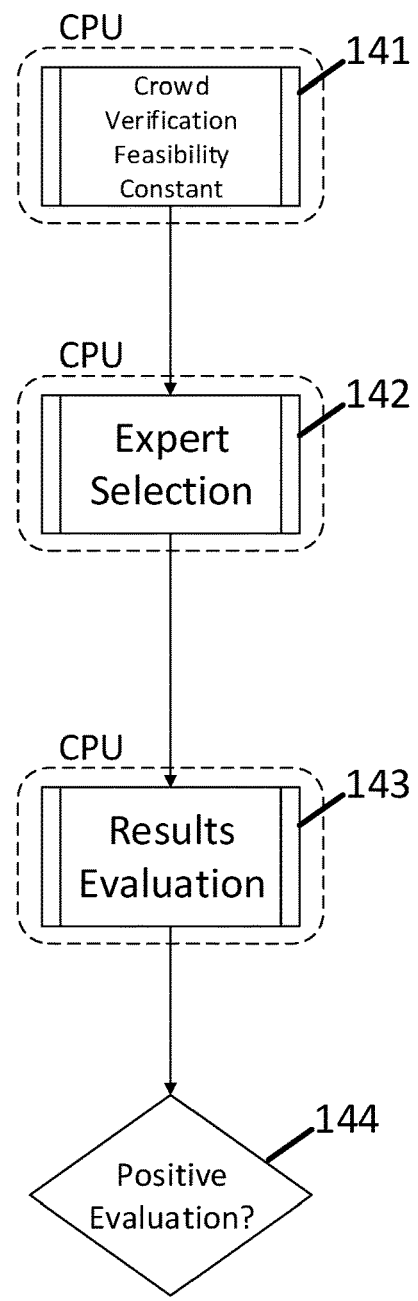
*Figure 5*  *Figure 6*

ASSOCIATION-RULE BASED DATA OUTLIER DETECTION AND RECORD COMPLETION SYSTEM AND METHOD

CROSS REFERENCE TO RELATED APPLICATION

This application claims priority from U.S. Application No. 63/435,864 filed on Dec. 29, 2022, entitled "ASSOCIATION-RULE BASED DATA OUTLIER DETECTION AND RECORD COMPLETION," which is hereby incorporated by reference in its entirety.

FIELD

This application relates generally to data mining in the context of structured, semi-structured or unstructured data. It relates, for example, to outlier detection (also referred to as "smell detection", "detection of data smells" or "anomaly detection") and record completion (which, in some contexts, is also referred to as "link prediction"). The application relates also to the areas of data preparation, data cleaning, and human-machine interaction.

BACKGROUND

Datalog Datalog is a rule-based logical query and programming language whose rules (in the basic version) syntactically correspond to universally quantified function-free Horn clauses. Datalog is a language tailored for relational databases and assumes an extensional database (EDB), for example, an enterprise database or knowledge graph, whose tables correspond to so-called EDB predicates. The EDB can also be supplied as an input stream of data tuples, or as a sequence of INSERT, DELETE, and sometimes also UPDATE commands, whose combined effect at a given moment in time determines the current content (or current state) of the EDB. There are various other methods for supplying an EDB.

From an EDB, a Datalog program P computes an intensional database (IDB), which consists of relational instances of the so-called IDB predicate symbols in the program. For example, if "parent" is a binary EDB relation where "parent(X,Y)" expresses that X is a parent of Y, then the following Datalog program computes the IDB relation "ancestor", which is the transitive closure of the parent relation. Here the ancestor IDB relation is also called an IDB predicate, and the name "ancestor" is an IDB predicate symbol. When the meaning is clear from the context, sometimes, a predicate symbol is simply referred to as "predicate".

parent(X,Y)→ancestor(X,Y).

parent(X,Y),ancestor(Y,Z)→ancestor(X,Z).

Datalog programs consist of rules such as the two above rules. Datalog in general does not have a standardized syntax. We will use the rule-style notation for Datalog and its extensions throughout this disclosure. However, there are various syntactic alternatives for writing down rules and programs in Datalog and its extensions. The choice of rule-style syntax is not intended to define or limit the scope of the disclosure.

Syntactically, the program corresponds to a conjunction of its two rules, and each rule corresponds to a first-order logic sentence. For example, the second rule is a syntactic equivalent of the first-order logic sentence $\forall X \forall Y \forall Z((\text{parent}(X,Y) \land \text{ancestor}(Y,Z)) \rightarrow \text{ancestor}(X,Z)))$.

However, semantically, Datalog transcends first-order logic as, for example, the transitive closure of a relation (rather than its transitivity) is not first-order definable.

Each rule of a Datalog program is of the following form:

$$\text{body} \rightarrow \text{head} \qquad (1)$$

where head is a single atom and body is a comma-separated list of atoms indicating their conjunction. An atom has a predicate symbol and arguments. Each variable that appears in a rule head must also appear in the body of the same rule. In the most basic version of Datalog, the predicate symbol of a Datalog atom is the name of an EDB or IDB relation, and the atom's arguments are variables. In other versions, comparison atoms such as, for example, X<Y are admitted in rule bodies, and in some versions, arguments can also be data constants of various types, for example, numerical values. In the context of Datalog, one identifies a tuple of a relation with a ground atom (also "ground fact"). A ground atom is an atom whose arguments are all data values (and not variables). For example, if "ancestor" is a relation containing the tuple "(adam,delila)", then this tuple corresponds to the ground atom "ancestor(adam,delila)". Vice-versa, a set of ground atoms can always be seen as a set of relations, one for each predicate name.

Association Rules Mining

Extrapolating information from large datasets is a central problem which has been addressed in several disciplines such as database theory, statistics, and artificial intelligence. In the first half of the 1990s, an approach called association rules mining (ARM) has been proposed. Association rule mining is a data mining technique used to uncover relationships between different items in a dataset, such as items that are frequently purchased together. It is a type of unsupervised learning, meaning that it does not require labelled data. This type of analysis can be used to identify customer buying patterns, which can be used to inform marketing strategies and product placement. It has also been widely used in many areas such as web usage mining, bioinformatics, retail, finance, healthcare and education. For instance, in retail, association rule mining can be used to analyze customer buying behaviours and recommend related products. In finance, it can be used to detect fraudulent transactions. In healthcare, it can be used to identify risk factors associated with diseases. And in education, it can be used to predict student performance based on past academic records.

The Apriori algorithm proposed by Agrawal and Srikant in 1994 is a bottom-up approach that uses a set of rules to identify frequent itemsets. The algorithm works by first identifying all items that appear in the dataset and then finding all combinations of items that appear together, i.e., the itemsets. The algorithm then calculates the support of each itemset and discards those whose value is below a certain user-defined threshold. The support is a representation of the usefulness of an itemset of attributes. A support value of, say, 0.02 would indicate that, of all the records mined, the attributes in the itemset under analysis appear together in at least 2% of the records. Once all the itemsets of maximum size are found, the association rules are created from these. For each itemset of the form $\{a(v_1), \ldots, a(v_n)\}$, n rules are created using one of the item $a(v_i)$ as the head of the rule and the remaining items $\{a(v_1), \ldots, a(v_n)\} \backslash \{a(v_i)\}$ as the body of the rule, where $1 \leq i \leq n$. Then, for each rule is computed a confidence score to rule measure the strength of the rule. Confidence is a representation of the certainty of an association rule. A confidence of, say, 0.6 for a given association rule would indicate that 60% of the times that the body of the rule is found true in the records of the dataset, also the head is true.

The Apriori algorithm is just one of many algorithms used for association rule mining. Other algorithms include the Eclat algorithm, which is a depth-first approach, and the FP-Growth algorithm, which is a more efficient version of the Apriori algorithm. Each algorithm has its own strengths and weaknesses, and the choice of algorithm depends on the dataset and the desired results. In addition to the algorithms used for association rule mining, there are also several metrics used to measure the strength of the association between items. Other than support and confidence, described in the previous paragraph, the lift can be used. The lift value is the ratio of the confidence of the itemset to the expected confidence if the items were independent.

Fuzzy Logic

Fuzzy logic is a form of many-valued logic based on the idea of fuzzy sets, introduced by Zadeh in the 1960s. Fuzzy logic is a branch of logic used to handle data that are, inherently, not crisp, i.e., information that is not entirely true or false. An example of such kind of information is weather forecast data. The truth values of data points in fuzzy logic are real numbers in the interval [0, 1]. Fuzzy logic can be used to model complex systems that are difficult to model using traditional methods such as in boolean logic where truth values are either 0 or 1. Fuzzy sets are imprecise statements such as tall or short, which are relative but not absolute measures, to which data points can be assigned by using membership functions. The most common membership functions are the trapezoid or triangle-shaped curves. Each data point is assigned to one or more fuzzy sets and associated with a degree of belonging to the membership function (also referred to as truth degree) in the interval [0, 1]. Fuzzy Logic can be used to make decisions based on multiple criteria. Fuzzy logic uses a set of operators to replace the common boolean operators. The set of operators proposed by Zadeh is the same used for Gödel fuzzy logic: $AND(x, y)=MIN(x, y)$, $OR(x, y)=MAX(x, y)$, $NOT(x)=1-x$. Several other operators have been proposed, giving raise to different semantics and fuzzy logics named after these such as the fuzzy logics based on t-norms. The most famous t-norm fuzzy logics are Łukasiewicz fuzzy logics, which employs the following set of operators $AND(x, y)=MAX(0, x+y-1)$, $OR(x, y)=MIN(1, x+y)$, $NOT(x)=1-x$ and product fuzzy logic, which employs the following set of operators $AND(x, y)=x*y$, $OR(x, y)=MAX(x, y)$, $NOT(x)=1-x$. Since its introduction, fuzzy logic has become increasingly popular as a tool for solving complex problems. It has been used in many fields such as AI, search engines, engineering, medicine, economics, and robotics. One of the advantages of using fuzzy logic to handle uncertainty, rather than using probabilistic systems (in the cases where probabilities are not required), relies on the simplicity of the formalism that can achieve real-time performances to make fast decisions, which is useful for applications such as robotics.

Since the introduction of association rules, several techniques for mining those in several different settings have been studied and proposed. The first presented methods for mining association rules made use of the baseline technique referred to as the "Apriori algorithm", measuring the interestingness of rules via support and confidence values. Other methods included extensions to the standard mining techniques to exploit the availability of taxonomies. By classifying the items in the transactions into the mentioned taxonomies, it is possible to generate more general association rules that take into account not only items but classes (intervals) of items.

Some methods use discretization techniques to handle the mining process over attributes whose range would otherwise be too broad. A discretization technique is a method for replacing a large number of values from a (possibly continuous) linearly ordered domain with a smaller number of intervals of values in that domain. The problem associated with itemsets whose domain range is too broad is referred to as MinSup problem, presenting low support values due to an excessively fine granular specification of the attributes. This can be addressed using discretization techniques. Though, if the number of classes (intervals) in which the attributes are mapped is too limited, the mining algorithm might incur the MinConf problem, dual to the MinSup one. MinConf is present in association rules whose confidence value is too low. A possible cause for this problem could be the excessive generality of the association rules, which causes the method to try fitting a specific pattern into a high number of transactions in the database. Other applications proposed methodologies for dividing the association rule mining problem into independent subtasks in order to parallelize the execution in a distributed context.

Some applications employ user-defined constraints within the association rule mining algorithm, rather than applying those at the end of it, in order to reduce the time required by the mining process itself. In this case, all the generated rules will satisfy (and be restricted to) the user-defined constraints. Uninteresting rules are pruned utilising the standard support and confidence values. Other approaches introduced new methodologies for measuring the interestingness of association rules. These would use statistical techniques in order to find a ranking of the produced association rules in order to prune those considered not significant.

One approach to producing such a ranking generates synthetic databases and measures the probability that a transaction contains a given itemset on such databases. Yet other methods have been proposed to find weighted association rules, where the items in the transactions are associated with weights.

Drawbacks of Conventional/Current Approaches

The current approaches to association rule mining present several limitations. First, the algorithms used are often computationally intensive and require large amounts of data to be processed. This can be a problem for smaller datasets, as the algorithms may produce association rules of low quality due to the lack of data. Additionally, the algorithms may not be able to detect subtle patterns in the data if those patterns do not appear often in the dataset. Secondly, conventional approaches using association rule mining techniques lack scalability features. Association rule mining algorithms are not very efficient when dealing with large datasets because the number of possible rules that can be generated increases exponentially with the size of the dataset. Thirdly, current approaches lack of accuracy of the mined association rules. Association rule mining algorithms alone are not very accurate in predicting the strength of the association between items. This is because the algorithms focus on predicting all the possible association rules based on some heuristics. Fourthly, systems based on association rule mining often lack interpretability. This is partially due to Association rule mining algorithms not being very interpretable. On top of this, the huge amount of rules usually produced by such systems is hard to be reviewed. This is partially due to the nature of the association rules. However, this could be reduced by using data visualization techniques.

Sixthly, an aspect usually not considered is the integration of the human component with the business processes. Finally, no approach has been proposed to manage, in a unified way, all of the aspects treated in this invention. Applying the existing and newly proposed techniques requires orchestration and self-adjusting algorithms not found in the current literature. As such, it is important to consider these limitations when using association rule mining algorithms.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

An association rules-based data outlier detection and record completion system and method is discussed herein.

The disclosed examples may include one or more of the features described herein.

In main examples, association rules are generated from a database with possibly incomplete (where, in the case of a relational database, is indicated via the null value "NULL"), erroneous or non-crisp (fuzzy) data. The generated rules are applied to the records in the database to detect outliers (and thus possibly erroneous data items in the database) and/or to complete records with missing and/or partial information.

In one of these examples, a method ARM(D, I) for mining association rules AR is used over an input database D stored in one or more electronic storages, and a set I of input parameters, some of which express constraints on the quantity and quality of the rules to be mined. This method is executed by one or more processors. The input database D is an exact copy of another database $D_0$, where the original data are stored and protected from modifications and failures that might occur during ARM(D, I).

The set of mined association rules AR expresses data dependencies over the database D. D may contain fuzzy data, where rational truth values from the interval [0,1] augmented by a null value such as, for example, "NULL" are associated with data values. Here, 0 stands for "false", 1 stands for "true", and a null value means that the fuzzy truth value is unknown. A data value that is not associated with a fuzzy value has, by default, a truth value equal to 1. Thus, a traditional database corresponds to a fuzzy database where each data value has the crisp truth value 1.

According to another aspect, a method of association-rule based data outlier detection and data completion includes accessing from storage media by at least one processor data comprising:

an input database $D_0$ comprising a single relational table over a schema $A_0$ of attributes, where $A_0$ comprises a non-empty set of regular attributes $A_0^r$, and for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters, the method further comprising:
(i) making, by the at least one processor, a copy D of the input database $D_0$, where D's schema A is initially identical to $A_0$, the method henceforth operating on the database D, and, guided by the input parameters;
(ii) data preparation eliminating, by the at least one processor, attributes from A that are deemed irrelevant to the mining, and eliminating corresponding columns from D, eliminating from D records whose aggregate fuzzy truth value is below a constant specified in the input I, and performing, guided by input parameters, discretizations of domains and data values of certain attributes;
(iii) association rules mining, by the at least one processor, applied to D, which to each generated association rule ar computes and associates a support S(ar) and a confidence C(ar);
(iv) rule cleaning eliminating, by the at least one processor, statistically insignificant rules from the set of mined rules;
(v) rule evaluation, by the at least one processor, whereby generated association rules are sent for evaluation, and at least a subset of evaluations are received; and
(vi) rule application including performing, by the at least one processor, (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

According to an aspect, a system for association-rule based data outlier detection and data completion includes at least one processor to access from storage media data comprising:

an input database $D_0$ comprising a single relational table over a schema $A_0$ of attributes, where $A_0$ comprises a non-empty set of regular attributes $A_0^r$, and for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters, the at least one processor further to:
(i) make a copy D of the input database $D_0$, where D's schema A is initially identical to $A_0$, the method henceforth operating on the database D, and, guided by the input parameters;
(ii) data preparation to eliminate attributes from A that are deemed irrelevant to the mining, and eliminate corresponding columns from D, eliminating from D records whose aggregate fuzzy truth value is below a constant specified in the input I, and perform, guided by input parameters, discretizations of domains and data values of certain attributes;

(iii) association rules to mine applied to D, which to each generated association rule ar computes and associates a support S(ar) and a confidence C(ar);

(iv) rule cleaning to eliminate statistically insignificant rules from the set of mined rules; (v) rule evaluation whereby generated association rules are sent for evaluation, and at least a subset of evaluations are received; and (vi) rule application including to perform (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

According to an additional aspect, a non-transitory computer-readable storage medium includes instructions stored thereon that, when executed by a computing device cause the computing device to perform operations including association-rule-based data outlier detection and data completion, the operations including:

accessing from storage media data comprising:

an input database $D_0$ comprising a single relational table over a schema $A_0$ of attributes, where $A_0$ comprises a non-empty set of regular attributes $A_0^r$, and for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters, the operations further comprising:

(i) making a copy D of the input database $D_0$, where D's schema A is initially identical to $A_0$, the method henceforth operating on the database D, and, guided by the input parameters;

(ii) data preparation eliminating attributes from A that are deemed irrelevant to the mining, and eliminating corresponding columns from D, eliminating from D records whose aggregate fuzzy truth value is below a constant specified in the input I, and performing, guided by input parameters, discretizations of domains and data values of certain attributes;

(iii) association rules mining applied to D, which to each generated association rule ar computes and associates a support S(ar) and a confidence C(ar);

(iv) rule cleaning eliminating statistically insignificant rules from the set of mined rules; (v) rule evaluation, whereby generated association rules are sent for evaluation, and at least a subset of evaluations are received; and (vi) rule application including performing (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Dashed lines are used to indicate the mapping of a software element to hardware components. Dotted lines are used as a magnifier that shows the subprocesses of a process.

Wherever possible, the same reference numbers are used throughout the drawings to refer to the same or like elements of an embodiment, and wherein:

FIG. 5 illustrates subprocesses according to an example of the instant disclosure.

FIG. 6 shows subprocesses according to an example of the instant disclosure.

DETAILED DESCRIPTION

Figure 1:
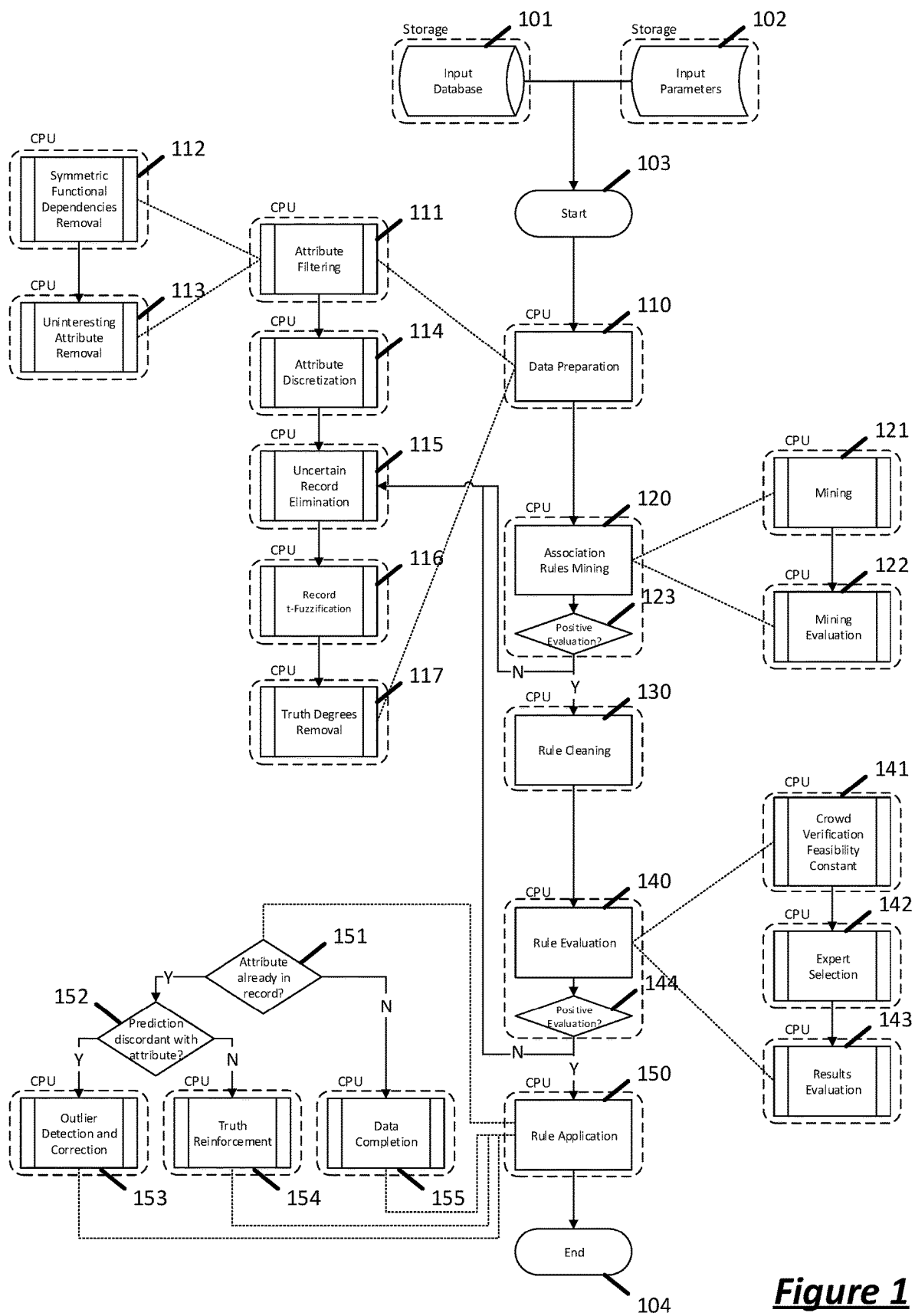
FIG. 1 illustrates a flowchart including main processes involved and all relative subprocesses according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Ranges are used herein shorthand so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including," and the like are used herein, the phrase "and without limitation" is understood to follow unless explicitly stated otherwise.

This disclosure discusses mining hidden patterns from structured/semi-structured/unstructured data into the form of universally quantified Datalog rules. These can be used to enhance the quality of the original database itself.

In one example, a method of association-rule based data outlier detection and data completion includes accessing from storage media by at least one processor data comprising:

an input database $D_0$ comprising a single relational table over a schema $A_0$ of attributes, where $A_0$ comprises a non-empty set of regular attributes $A_0^r$, and for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters, the method further comprising:
(i) making, by the at least one processor, a copy D of the input database $D_0$, where D's schema A is initially identical to $A_0$, the method henceforth operating on the database D, and, guided by the input parameters;
(ii) data preparation eliminating, by the at least one processor, attributes from A that are deemed irrelevant to the mining, and eliminating corresponding columns from D, eliminating from D records whose aggregate fuzzy truth value is below a constant specified in the input I, and performing, guided by input parameters, discretizations of domains and data values of certain attributes;

(iii) association rules mining, by the at least one processor, applied to D, which to each generated association rule ar computes and associates a support S(ar) and a confidence C(ar);

(iv) rule cleaning eliminating, by the at least one processor, statistically insignificant rules from the set of mined rules;

(v) rule evaluation, by the at least one processor, whereby generated association rules are sent for evaluation, and at least a subset of evaluations are received; and (vi) rule application including performing, by the at least one processor, (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

Example Hardware and Software

Hardware infrastructure may include one or more computing devices comprising at least one processor, memory consisting of transitory storage and, in some examples, in addition, also non-transitory storage, the computing devices being able to execute programs stored in the memory, to accept input from a user or from some application and store this input in its memory, and to provide the output of a computation either through an interface or by storing the output into an accessible memory space.

The software infrastructure may comprise an environment for software execution, one or more environments providing machine learning tools such as those required in the methodology described in this patent and/or ad-hoc designed implementations. One such framework is Weka, a collection of machine learning algorithms for data mining tasks.

EXAMPLE EMBODIMENTS

As an example, as shown in FIG. 1, a system may include a series of inputs either stored on non-transitory computer-readable storage or provided by a human with a human-computer input interface. In the following, an example input is provided, with default values for most of the parameters to simplify the usage for inexperienced users. Coupled with the set of parameters indicated in the input (102), the procedure described in this invention requires a database $D_0$ (101) with an associated schema $A_0$ of $D_0$ which can be stored on non-transitory computer-readable storage. Moreover, every time that a deletion of an attribute from A (column from D) is performed, the relative column from D (attribute from A) is deleted as well. The database D might contain fuzzy data. For some attributes a∈A, the value val(a, r) of each record r can be paired with a truth value (a.k.a. fuzzy truth value, degree of certainty or truth degree) t(a, r). This is done by adding an extra column $t_a$ to D (i.e., an attribute in A) containing the respective certainty degrees of the attribute a. If for an attribute no such extra column is given, all data values for this attribute are by default assumed to have certainty degree 1. (An example is given in Table 1 in the description of Data Preparation (110) below.)

The procedure must also have access to a database E containing, for each expert e involved in the reviewing process of the current or past iterations of the procedure, information about their revisions history. The schema of E is the following: (expert_id, attribute, #checks). Here, the values of the expert_id attribute are unique identifiers associated with each expert e, the values of the attribute attribute are the attributes names of D and, in each tuple of E having expert_id=e and attribute=a, the value of #checks is the number of checks involving a rule from AR containing attribute a that expert e has made so far.

In an example shown in FIG. 1, the method ARM(D, I) comprises the following processes: Data Preparation (110) with the subprocesses Attribute Filtering (111), which includes Symmetric Functional Dependencies Removal (112) and Uninteresting Attribute Removal (113), Attribute Discretization (114), processes to manage fuzzy data consisting of Uncertain Record elimination (115), Record t-Fuzzification (116) and Truth Degrees Removal (117), all to be thoroughly explained further below; Association Rules Mining (120) consisting of the subprocesses of Mining (121) and Mining Evaluation (122); Rule Cleaning (130), utilizing a different combination of metrics to filter out low-quality rules; Rule Evaluation (140), comprising methodologies to select association rules from AR (Crowd Verification Feasibility Constant 141) and Expert Selection (142) employed to conduct the Results Evaluation (143). Upon a positive evaluation of ARM(D,I), the stored rules AR are used by the Rule Application (150) which performs one of the following subprocesses over the original database DO: Outlier Detection (153); Truth Reinforcement (154); Data Completion (155). The tasks described in the subprocesses 153, 154 and 155 are either triggered automatically after 140, or are computed at a later moment, when triggered by user input.

Another example differs from the above one in that the relevant set of input parameters is not given a priori, but is dynamically supplied whenever needed by a human user through an appropriate input device. The rule set AR resulting from this process would then be evaluated with semi-automatic evaluation.

Further examples use human rule validation performed by one or more domain experts as part of the process, possibly combined with automated rule validation. In some of these examples, once all human experts involved have terminated their evaluation of the rule set AR, a trigger is activated to either restart the computation with an automatic process to increase the minimum values in I to produce more restrictive rules, or to confirm the satisfactory quality of the produced rules AR. Every time that a diamond element is utilised in the diagrams represented in the figures (such as 123, 144, 151 and 152 appearing in FIG. 1), the computation may proceed following one of two different paths.

Input I (102)

(i) Set FD of non-trivial functional dependencies (FDs) of A of the form L→R where L, R⊆A are possibly compound attributes of A. This set FD is supposed to be a cover that logically entails all valid functional dependencies holding over A in a given context.

(ii) Set U⊆A of known uninteresting single attributes from A. If not provided, no attribute is considered to be uninteresting. An attribute a is considered to be uninteresting if it is undesired that it appears in the body of an association rule.

(iii) Set Int⊆(A\U) of known interesting attributes to be mined over A, where an attribute a is interesting if the user is interested in finding rules $a_1, \ldots, a_r \to a$.

(iv) Set B={$b_1[\sigma_1], \ldots, b_d[\sigma_d]$} of attributes in A that need to be discretized.

For any attribute $b_i$, where $1 \le i \le d$, $\sigma_i$ is a method specifier, that is, $\sigma_i \in \mathbb{N} \cup \{\text{true}\} \cup MF$. $\sigma_i$ specifies how the values of attribute $b_i$ of relation schema A ought to be discretized, where MF={$mf_1, \ldots, mf_n$}. $mf_i \in MF$ is a data structure of the form {mf, q} where mf is a membership function that maps the value of the attribute $b_i \in B$ to a class and $q \in \mathbb{N}$. In particular, if $\sigma_i \in \mathbb{N}$ then $\sigma_1$ indicates the number of classes into which the user intends to divide the values of attribute $b_i \in B$. If $\sigma_i$=true, then it indicates performing an unsupervised segmentation method for the attribute $b_i$. If $\sigma_i \in MF$, then the value $q \in \sigma_i$={mf, q} indicates in how many classes the values will be discretized using the membership function mf. Finally, if $sigma_i$ is not provided, a default value of, say, $sigma_i$=5 will be used.

(v) $m \in [0, 1]$, where, in case non-crisp truth values are provided together with data values in A, m is a threshold value which indicates that any record r in which at least one truth value $t(a, r) < m$, for each $a \in A$, should not be considered for the Association Rules Mining (120). Thus, r should not be part of the training data. (However such tuples will be considered in the process of Rule Application (150) described further below.) If not provided, a default value of, say, m=0.5 will be used.

(vi) A parameter $\tau$ together with a parameter t, where t indicates the minimum aggregate truth value that each record (i.e., data tuple) $r \in D$ needs to have in order to be part of the data mining process. Here, $\tau \in \{L, P, G\}$ specifies how the aggregate truth value $t_r$ of an entire record $r \in D$ is computed using the truth values of its attributes, whereas t states the minimum truth value for each record to be considered. In particular, $\tau$ refers to the t-norm to be utilized in the Record t-Fuzzification process described further below. This can be one of {Łukasiewicz t-norm, Product t-norm, Gödel t-norm}. If not provided, fixed default values such as, for example, $\tau$=L and t=0.5 are assumed. Each record r for which $t_r < t$ should be disregarded by the rule mining process (for example, by eliminating such records from D).

(vii) A minimum support cutoff constant expressed as a fraction $S \in (0, 1]$. If not provided, a default value of, say, S=0.05 will be used. As will be explained later, this constant will be used to eliminate mined itemsets with low support.

(viii) A minimum confidence cutoff constant expressed as a fraction $C \in (0, 1]$. If not provided, a default value of, say, C=0.75 will be used. As will be explained later, this constant will be used to eliminate mined itemsets with low confidence.

(ix) A minimum number of rules $nr_{min}$ to be mined, where $nr_{max} \ge nr_{min}$. If not provided, a default value of, say, $nr_{min}$=10 will be used.

(x) A maximum number of rules $nr_{max}$ to be mined, where $nr_{max} \ge nr_{min}$. If not provided, a default value of, say, $nr_{max}$=1000 will be used.

(xi) A minimum Kulczynski measure value $K \in (0, 1]$. If not provided, a default value of, say, K=0.75 will be used.

(xii) A minimum Kulczynski and Imbalance Ratio combination value $KIR \in (0, 1]$. If not provided, a default value of, say, 0.75 will be used.

(xiii) ARM $\in$ {FP,Apriori, Eclat}, where ARM is a standard association rule mining algorithm chosen from the set {FP-growth, Apriori, Eclat}. If not provided, a default value of, say, FP will be used.

(xiv) $l \in [0, 1]$, where l is the fraction of rules to be tested in order to estimate the overall quality of the rule set. If not provided, a default value of, say, l=0.3 will be used.

(xv) Human In The Loop $HITL \in \mathbb{N}$ throughput capacity. HITL is the number of tasks that can be elaborated by the human validators involved in the verification of the process.

(xvi) A parameter $p \in [0, 1]$ indicating the minimum accuracy fraction desired from the evaluation of the generated rules. If not provided, a default value of, say, p=0.70 will be used.

(xvii) A structure $SS = \langle ss_m, ss_t, ss_S, ss_C, ss_{nr_{min}}, ss_{nr_{max}}, ss_K, ss_{KIR}, ss_l, ss_p \rangle$ where each element of S indicates the step size expressed as a fraction to be used if the procedure needs to trade the overall quality of the results produces for termination guarantees of the overall process. If not provided, a default value of, say, $SS = \langle ss_m=0.1, ss_t=0.1, ss_S=0.1, ss_C=0.1, ss_{nr_{min}}=0.1, ss_{nr_{max}}=0.1, ss_K=0.1, ss_{KIR}=0.1, ss_l=0.1, ss_p=0.1 \rangle$.

(xviii) A parameter $e_b \in [0, 1]$ indicating the relative importance used to account for revisions of attributes, performed by an expert, in the body of a rule. If not provided, a default value of, say, $e_b$=0.25 will be used.

(xix) A parameter $e_h \in [0, 1]$ indicating the relative importance used to account for revisions of attributes, performed by an expert, in the head of a rule. If not provided, a default value of, say, $e_h$=1 will be used.

(xx) A parameter $TO \in \mathbb{N}$ indicating the timeout, expressed in minutes, for the receipt of an expert feedback. If not provided, a default value of, say, TO=180 will be used.

(xxi) A parameter $tr_{old} \in [0, 1]$ indicating the relative importance that the truth value of a record should hold when performing the update of the truth degrees during the Truth Reinforcement (154) process described further below. If not provided, a default value of, say, $tr_{old}$=0 will be used.

(xxii) A parameter $tr_{new} \in [0, 1]$ indicating the relative importance that the confidence of an association rule should hold when performing the update of the truth degrees of the records in $D_0$ (101) during the Truth Reinforcement (154) process described further below. If not provided, a default value of, say, $tr_{new}$=1 will be used.

Hereinafter, an example is described. Notably, this is a non-limiting list of processes that can be further enhanced with more other ones to further increase, for example, the data quality, the quality of the rules mined and many others. Likewise, the process can be simplified by dropping out some of the processes which are not directly involved in the generation of the association rules but rather indirectly connected by augmenting the quality of the rules or results of the rules application quality.

The Processes Carried Out in ARM(D, I) in an Example

The five processes as used in an example are described in detail below, and illustrated by the use of a running example. FIG. 1 shows an overview of an example, including all the subprocesses. The computation starts from the element 103 and stops when element 104 is reached. In addition, with each process, examples of variations and/or extensions are discussed. All these examples are not to be intended to be limiting.

Data Preparation (110)

The relation schema A of the input database D might contain attributes that are redundant and/or uninteresting for the purposes of mining association rules. Using these attributes would lead to an unnecessarily slower Mining (121) process due to the necessity to consider larger itemsets/FP-trees (depending on the utilised ARM algorithm). Therefore, it is preferable to exclude such attributes from the data considered in the procedure. Moreover, trying to mine association rules whose attributes have a domain with a wide range of values can slow down the procedure. Therefore, the current process executes a set of sub-processes to prepare the input data by eliminating (projecting out) unnecessary attributes.

Moreover, the system uses novel methodologies to handle fuzzy values for the attributes of records in D. The problem of mining association rules in such a setting is addressed by making use of a mixture of t-normalization techniques and thresholding, guided by the specifications given in the input parameters I (102). Here below, an example database $D_{ex}$ is introduced for showcasing the effect of the application of the various sub-processes of the Data Preparation (110). The data shown in $D_{ex}$ are purely fictitious and do not aim to represent the reality of the cited companies.

TABLE 1

Example database $D_{ex}$ over company data including fuzzy values for two attribute.

| id | name | description | #employees | income | esg | $t_{esg}$ | sent | $t_{sent}$ |
|---|---|---|---|---|---|---|---|---|
| 1 | Alphabet | Alphabet is . . . | 150K | 80 B | medium | 0.8 | + | 1 |
| 2 | Apple | Apple is . . . | 130K | 100 B | high | 1 | = | 0.8 |
| 3 | Meta | Meta is . . . | 70K | 120 B | medium | 0.3 | = | 0.5 |
| 4 | Microsoft | Microsoft is . . . | 22K | 60 B | low | 0.9 | + | 0.7 |
| 5 | Tesla | Tesla is . . . | 110K | 5 B | high | 0.2 | − | 0.7 |
| 6 | ACME | ACME is . . . | 100K | 20 B | low | 0.7 | − | 1 |

The database $D_{ex}$ contains 9 columns, 2 of which represent truth values. id∈ℕ is the primary key of the database. name and description are strings representing respectively the name and a description of the companies. #employees ∈ ℕ represents the number of employees in a company. esg∈{low, medium, high} and sent ∈{+, −, =} are scores representing, respectively, the environmental, social, and governance (esg) score of the company and an analysis of the clients' sentiment toward the company. Finally, $t_{esg}$∈[0, 1] and $t_{sent}$∈[0, 1] represent, respectively, the truth values of the columns esg and sent. The sub-processes of Data Preparation (110) are now described in order.

Attribute Filtering (111)

Figure 3:
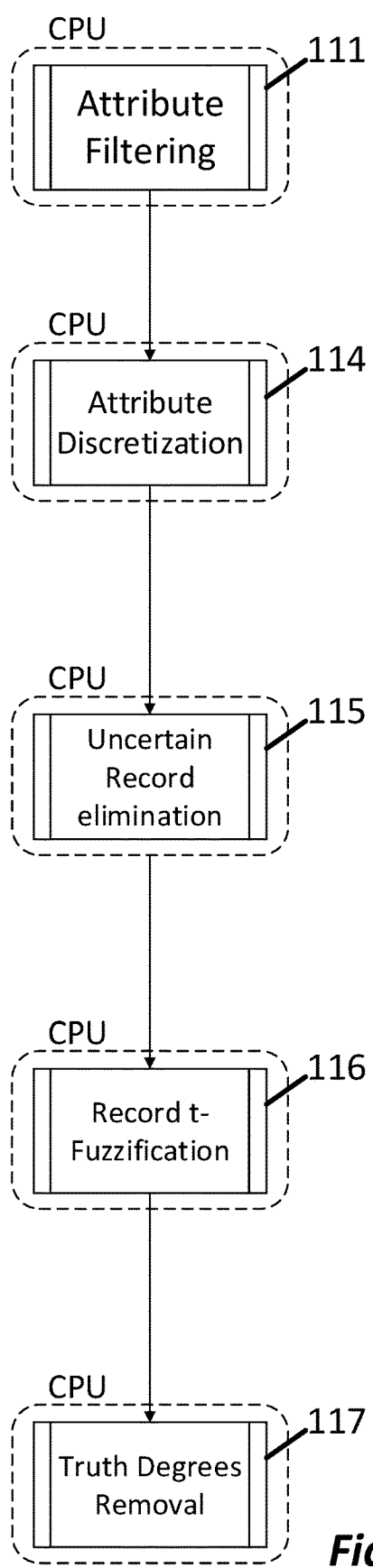
FIG. 3 is another flowchart according to an example of the instant disclosure.

As shown in FIGS. 1 and 3, the method safely eliminates attributes of two classes from the database D and the corresponding relation schema A. These attributes correspond to non-informative data with respect to the scope of finding association rules. This process is important to improve the performance of the Mining (121) by reducing the quantity of data to analyze and simplifying the resulting rules, generating more concise rule bodies.

The Attribute Filtering subprocess is composed of two further subprocesses: Symmetric Functional Dependencies Removal (112) and Uninteresting Attribute Removal (113). Both are explained in detail further below.

Symmetric Functional Dependencies Removal (112)

Figure 4:
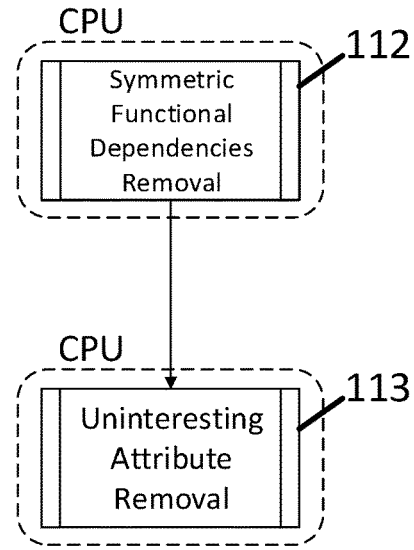
FIG. 4 illustrates the subprocesses and is another flowchart according to an example of the instant disclosure.

As shown in FIGS. 1 and 4, if the set FD of functional dependencies in A is not empty, then the procedure uses standard algorithms to iteratively find all symmetric pairs of FDs a→a' and a'→a, for (single) attributes a, a'∧A. After each such iteration, if a'∉B, eliminate a' from A (that is: A:=A\{a'}), otherwise eliminate a from A (i.e., A:=A\{a}). If either a∈U or a'∈U, delete both a and a'. However, the set FD of FDs, remains unchanged.

For example, if the input I (102) specifies FD={id→name, name→id, name→description, description→name}, U={description}, the result of the Symmetric Functional Dependencies Removal (112) on $D_{ex}$ is as shown in Table 2, Where all the attributes appearing in the symmetric functional dependencies have been removed since description ∈U is part of the series of symmetric functional dependencies to be removed.

TABLE 2

Example database $D_{ex}$ after the removal of symmetric functional dependencies.

| #employees | income | esg | $t_{esg}$ | sent | $t_{sent}$ |
|---|---|---|---|---|---|
| 150 K | 80 B | medium | 0.8 | + | 1 |
| 130 K | 100 B | high | 1 | = | 0.8 |
| 70 K | 120 B | medium | 0.3 | = | 0.5 |
| 22 K | 60 B | low | 0.9 | + | 0.7 |

TABLE 2-continued

Example database $D_{ex}$ after the removal of symmetric functional dependencies.

| #employees | income | esg | $t_{esg}$ | sent | $t_{sent}$ |
|---|---|---|---|---|---|
| 110 K | 5 B | high | 0.2 | − | 0.7 |
| 100 K | 20 B | low | 0.7 | − | 1 |

Uninteresting Attribute Removal (113)

As shown in FIGS. 1 and 4, remove from A all the uninteresting attributes U indicated in the input I (102), such that A'=A\U. For the rest of the procedure, retain only the attributes in A'. For example, if I specifies U={description}, the result of the Uninteresting Attribute Removal (113) on $D_{ex}$ is the same as 2, since description is part of a series of symmetric functional dependencies in FD.

Attribute Discretization (114)

As shown in FIGS. 1 and 3, "attribute discretization" refers to the process of mapping and transferring continuous or very large domains (or ranges) of certain attributes into discrete smaller counterparts, and replacing data values of these attributes in the database D accordingly. Thus, by abuse of language, discretization here does not only apply (as usual) to infinite domains (such as the integers or the rational numbers) but also to large domains or sets of values, that will be replaced by smaller discrete domains of new values, each new value usually corresponding to a class or interval of old values.

Association rules find their historical origin in the Market Basket Analysis problem, where the value to predict is either true or false (i.e. the item is in or not in the basket). The association rules were originally not meant to predict that an attribute value belongs to a certain class among an arbitrarily high number of classes. To produce association rules that take into account attributes whose domain values' range is infinite (or, anyway, vast), these attributes must be discretized into a small finite number of classes representing intervals of values. For each b[σ]∈ B provided in I (102), the procedure performs a customized discretization of the attribute b according to the method specifier σ:

- If σ∈ $\mathbb{N}$, the values of the column b∈ D are ordered in an ascendant fashion, considering either a numerical order in case the column type is numerical, or a lexicographical order otherwise. Computing the cardinality of the active domain |$AD_b$|, where the active domain of a column is the set of values appearing in the column itself, the values on b are divided into σ segments of approximately $$\frac{|AD_b|}{\sigma}$$

values. Each record value v in the column b is replaced with a string c∈ {$C_1$, ..., $C_\sigma$} representing the membership to the computed class.

- If σ∈ MF, the values of the column b∈ D are discretized into q classes identified by the membership function mf, where σ={mf, q}. The mf is replicated q times and located equidistantly into the active domain $AD_b$. Each record value for the attribute b is replaced with a string c∈ {$C_1$, ..., $C_q$} indicating the membership to the nearest mf.

- If σ=true, Jenks Natural Breaks Optimization is performed to find a natural distribution for the values of the column b∈ D. Each record value for the attribute b is replaced with a string c∈ {$C_1$, ..., $C_j$}, where j is the number of classes individuated by the algorithm.

For example, if I specifies B={#employees[3],income[3] }, the result of the Attribute Discretization (114) on $D_{ex}$ is:

TABLE 3

Example database $D_{ex}$ after the attributes discretization.

| #employees | income | esg | $t_{esg}$ | sent | $t_{sent}$ |
|---|---|---|---|---|---|
| $C_3$ | $C_2$ | medium | 0.8 | + | 0.7 |
| $C_3$ | $C_3$ | high | 1 | = | 0.8 |
| $C_1$ | $C_3$ | medium | 0.3 | = | 0.5 |
| $C_1$ | $C_2$ | low | 0.9 | + | 0.7 |
| $C_2$ | $C_1$ | high | 0.2 | − | 0.7 |
| $C_2$ | $C_1$ | low | 0.7 | − | 1 |

Uncertain Record Elimination (115)

As shown in FIGS. 1 and 3, for each record r∈ D, if any attribute a∈ A has a truth value t(r, a)<m, where n is the minimum truth value for each attribute in a record to be considered valid indicated in I (102), exclude $r_i$ from the procedure. This ensures that no record containing an extremely low truth value on any of its attributes influences the association rules generated. In case m=0, no record is eliminated in this process. For example, if I specifies m=0.3, then the result of the Uncertain Record Elimination (115) on $D_{ex}$ is:

TABLE 4

Example database $D_{ex}$ after the removal of uncertain records.

| #employees | income | esg | $t_{esg}$ | sent | $t_{sent}$ |
|---|---|---|---|---|---|
| $C_3$ | $C_2$ | medium | 0.8 | + | 0.7 |
| $C_3$ | $C_3$ | high | 1 | = | 0.8 |
| $C_1$ | $C_3$ | medium | 0.3 | = | 0.5 |
| $C_1$ | $C_2$ | low | 0.9 | + | 0.7 |
| $C_2$ | $C_1$ | low | 0.7 | − | 1 |

Record t-Fuzzification (116)

As shown in FIGS. 1 and 3, for each record r∈ D, calculate the truth value t(r) of r using the t-norm $\tau$ specified in I. If t(r)<t delete r from D otherwise store t(r) so to recall it later.

This ensures that the aggregated truth value of each record utilised in the Mining (121) process of association rules will have minimum truth guarantees. For example, if I specifies that $\tau$ =L and t=0.5, then the result of the Record t-Fuzzification (116) on $D_{ex}$ is:

TABLE 5

Example database $D_{ex}$ after the Record t-Fuzzification (116).

| #employees | income | esg | $t_{esg}$ | sent | $t_{sent}$ | $t_{record}$ |
|---|---|---|---|---|---|---|
| $C_3$ | $C_2$ | medium | 0.8 | + | 0.7 | 0.5 |
| $C_1$ | $C_2$ | low | 0.9 | + | 0.7 | 0.6 |
| $C_2$ | $C_1$ | low | 0.7 | − | 1 | 0.7 |

Truth Degrees Removal (117)

As shown in FIGS. 1 and 3, remove all the attributes $t_a$ and $t_r$ indicating respectively the truth values of the attribute a or the truth value of the records in D. The truth values will not be used by subsequent processes in the algorithm. For example, if the schema A=(#employees, income, esg, $t_{esg}$, sent, $t_{sent}$, $t_{record}$), then the result of the Truth Degrees Removal (117) on $D_{ex}$ is:

TABLE 6

Example database $D_{ex}$ after the removal of truth degrees from the database.

| #employees | income | esg | sent |
|---|---|---|---|
| $C_3$ | $C_2$ | medium | + |
| $C_1$ | $C_2$ | low | + |
| $C_2$ | $C_1$ | low | − |

Non-Limiting Examples of Variations of Data Preparation (110)

This Section presents a non-limiting list of possible variations that can be applied to Data Preparation (110).

Examples of Alternative Symmetric Functional Dependencies Removal (112)

The method can dynamically check multiple times whether some FDs a→a' follow from FD. Instead, an example may first compute by well-known methods the set $FD^+$ all non-trivial FDs that logically follow from FD, and then in order to check a→a', merely test whether a→a' is contained in $FD^+$.

Alternatively, if the set FD of functional dependencies in A is not provided, then utilise standard algorithms for the discovery of FDs and proceed as usual for the removal of symmetric functional dependencies.

Non-Limiting Examples of Variations of Alternative Attribute Discretization (114)

For each b[σ]∈B provided in I (102), the procedure performs a customized discretization of the attribute b according to the method specifier σ as described in Attribute Discretization (114). A further parameter min_truth_discretization ∈ [0, 1] is required in I (102). min_truth_discretization indicates the minimum truth degree that discretized attributes are going to retain at the marginal values of the segments identifying different classes. While performing the Attribute Discretization (114), a truth value for each attribute b is retained in a possibly new column of $t_b \in D$. In case $t_b$ was not already present in D, it is computed as:

If σ∈ℕℕ and $$\frac{|AD_b|}{\sigma}$$

is the cardinality of values in a segment, for each segment $c_i$, with i∈[2, . . . , σ−1], store a truth value t(b, r)=1 in the column $t_b$ for the record r if val(b, r) lies in the middle of the segment. Otherwise, gradually discount t(b, r) up to the threshold min_truth_discretization for values val(b, r) that are on the edge of the segment. For segments $c_1$ and $c_α$ there all the records that fall into the first half of segment 1 and the second half of segment σ there is no discounting.

- If σ∈MF, where σ={mf, q}, the truth values for $t_b$ are automatically identified upon the use of the membership function mf.
- If σ=true, Jenks Natural Breaks Optimization is performed and a similar behaviour as when σ∈ℕ is applied.

In case $t_b$ was already present in A, meaning that the attribute b already has a fuzzy value associated, then compute $t_b$' as above described and overwrite the values in $t_b$ as val($t_b$, r)=val($t_b$, r)⊙$_L$ val($t_b$', r), where $⌊_L$ is the standard Łukasiewicz t-norm.

As an additional alternative, if σ∈ℕ, the class size used for splitting the records in D into different classes can be computed as $$\frac{\max(b) - \min(b)}{\sigma}.$$

A further variation might include methods of adjusting the truth value associated with the discretized attributes. In some applications, mapping the value of an attribute of a record v(a, r) into a restricted domain might influence the truth value v($t_a$, r). Assume, for example, that the salary of all managers of a company ACME is known and asserted with truth value 1 in the database before discretization. These salaries are then discretized into four category-values: "low" for all salaries that are less than 100,000, "medium" for salaries in the (right-open) interval [100000,200000[, "high" for salaries in the interval]200000,500000] and "very high" corresponding to all salaries greater than 500000. Now, for example, it could be meaningful to lower the original truth values for discretized attribute values whose original (non-discretized) values lie at the border of the relevant interval. For example, assume that Marta's salary was 500,001.00 in the original database with truth value 1. In the discretized database this could then be "very high" with a truth value of 0.9, as this value is close to the border between "high" and "very high". Such adjustments are really application-dependent and could be expressed through an application-specific truth-value adjustment function taf$_a$ for an attribute a∈A to be discretized. For each original a-value v(a,r) for some record r, with associated certainty v($t_a$,r) the function application taf$_a$(v(a, r), v($t_a$, r)) will yield the truth value v($t_a$, r) for the updated record r after discretization. For a number of attributes a, the associated functions taf$_a$ may be specified as part of the input parameters I.

When σ∈MF, then the membership function themselves are a natural choice for possible concrete incorporations of the functions taf.

Non-Limiting Examples of Variations of Record t-Fuzzification (116)

To perform the Alternative Record t-Fuzzification, a new parameter mul∈ℕ is required in I (102). If not provided, a default value of, say, mul=5 will be used. Compute the aggregated truth value $t_{r_i}$ of each record $r_i \in D$ using the t-norm τ specified in the input I and the multiplier mul specified in I and store it together with $r_i$. Construct a new database D' where each record $r_i \in D$ is written a number of times equal to round($t_{r_i}$*mul), where the function round( ) takes in input a float number and returns the nearest integer. This will create a larger database which will reflect the record-relative significance through the number of times that the record appears in the database. This behaviour, during the Mining (121) of association rules, pushes down the confidence and support values of records with smaller truth values. For example, if the input I specifies that τ =L and mul=5, the result of the Alternative Record t-Fuzzification on $D_{ex}$ is:

Non-Limiting Examples of Variations of Truth Degree Removal (117)

Remove the attribute $t_r$ indicating the aggregated truth value of the records in D. Note that the attributes $t_a$, for each a∈A, are preserved to be used in Alternative processes of the procedure.

For example, if the schema A=(#employees, income, esg, $t_{esg}$, sent, $t_{sent}$, $t_{record}$), then the result of the Truth Degrees Removal (117) on $D_{ex}$ is:

TABLE 7

Example database $D_{ex}$ from Table 4 after the Alternative Record t-Fuzzification.

| #employees | income | esg | $t_{esg}$ | sent | $t_{sent}$ | $t_{record}$ |
|---|---|---|---|---|---|---|
| $C_3$ | $C_2$ | medium | 0.8 | + | 0.7 | 0.5 |
| $C_3$ | $C_2$ | medium | 0.8 | + | 0.7 | 0.5 |
| $C_3$ | $C_2$ | medium | 0.8 | + | 0.7 | 0.5 |
| $C_3$ | $C_3$ | high | 1 | = | 0.8 | 0.2 |
| $C_1$ | $C_2$ | low | 0.9 | + | 0.7 | 0.6 |
| $C_1$ | $C_2$ | low | 0.9 | + | 0.7 | 0.6 |
| $C_1$ | $C_2$ | low | 0.9 | + | 0.7 | 0.6 |
| $C_2$ | $C_1$ | low | 0.7 | − | 1 | 0.7 |
| $C_2$ | $C_1$ | low | 0.7 | − | 1 | 0.7 |
| $C_2$ | $C_1$ | low | 0.7 | − | 1 | 0.7 |
| $C_2$ | $C_1$ | low | 0.7 | − | 1 | 0.7 |

TABLE 8

Example database $D_{ex}$ after the removal of the
record aggregated truth value from the database.

| #employees | income | esg | $t_{esg}$ | sent | $t_{sent}$ |
|---|---|---|---|---|---|
| $C_3$ | $C_2$ | medium | 0.8 | + | 0.7 |
| $C_1$ | $C_2$ | low | 0.9 | + | 0.7 |
| $C_2$ | $C_1$ | low | 0.7 | − | 1 |

Association Rules Mining (120)
Mining (121)

As shown in FIGS. 1 and 5, perform over D the Mining (121) task using a pre-built implementation of the selected algorithm ARM indicated in I (102), with confidence and support minimum fraction values of, respectively, C and S indicated in I. This produces as output a list of association rules AR of the form body→head, where body is a non-empty list (expressing a conjunction in case of more than two elements) of one or more ground atoms, and head is a single ground atom. The procedure also uses the set Int of known interesting attributes to be used as targets of the association rules predictions, i.e. as the ground atom in the head of each ar.

The Mining (121) process and the selected support framework generate association rules as discussed below. In particular, the case where ARM=Apriori is outlined, where the constant Apriori indicates the use of the standard Apriori association rules mining algorithm. It employs an iterative approach to compute all the frequent itemsets, where a frequent itemset is defined as the set of attribute values that appear frequently in D. It starts by computing all the frequent itemsets of dimension 1 and, in each iteration, uses all the itemsets of iteration k−1 to compute the itemsets of iteration k. The algorithm computes a support value associated with each candidate itemset $AV=\{a_1(v_1), \ldots, a_k(v_k)\}$, where, for $1 \leq i \leq k$, $a_i \in A$ and $v_i = val(a_i, r)$ for some record r of D, computed as:

$$S(AV) = P(AV) = \frac{\text{number of records containing } AV}{\text{number of all records in } D} \quad (2)$$

All the candidate itemsets of a given iteration k satisfying the minimum support fraction S indicated in I are consolidated as itemsets of the iteration k. To compute the itemsets of iteration k, a join step between all of the itemsets at iteration k−1 is performed, verifying the satisfaction of the minimum support for the new candidate itemsets.

Once all the frequent itemsets are generated, these are used to generate association rules, using one of the attribute values in the itemset as the head of the rule and the remaining attribute values as the body of the rule. The set of attributes Int provided in I is used to reduce the amount of generated rules. If Int≠0, the attribute values used in head are drawn only from the attributes in Int.

Consider an association rule ar of the form shown in Equation 1, where head=a(v). Then, for each record r, body represents the set of conditions that all have to be satisfied to predict that the value of the attribute a of r is v.

To filter out weak association rules, the algorithm ARM associates a confidence value C(ar) to each computed association rule ar∈ AR as follows:

$$C(ar) = P(head(ar)|body(ar)) = \frac{S(ar)}{S(body(ar))} \quad (3)$$

where $S(ar)=S(body(ar) \cup head(ar))$. Each ar∈ AR will respect the minimum value of C(ar)>C and S(ar)>S, where C and S are provided in the input I.

If the database used to perform the Mining (121) process is $D_{ex}$ described in Table 6, the input I specifies Int=esg, sentiment, income(C), assuming a more numerous set of tuples used for the Mining (121), a plausible set of association rules would be:

employees($C_i$), income($C_j$)→esg(low)

employees($C_m$), income($C_n$)→sentiment(+)

esg(high)→income($C_l$)

. . .

Here above, the classes of #employees and income use generic indexes to keep the example more abstract.

Mining Evaluation (122)

As shown in FIGS. 1 and 5, if the number or association rules produced $|AR|<nr_{min}$, or $|AR|>nr_{max}$, where $nr_{min}$ is the desired minimum number of rules indicated in the input I (102), then the evaluation is not considered successful (123). The computation restarts from Uncertain Record Elimination (115). In the case of $|AR|<nr_{min}$, a Parameter Modification is performed over the input parameters as follows:

$m := m-(m*ss_m)$ $t := t-(t*ss_t)$ $S := S-(S*ss_S)$ $C := C-(C*ss_C)$ $nr_{min} := nr_{min}-(nr_{min}*ss_{nr_{min}})$ In the case of $|AR|>nr_{max}$, the above-presented Parameter Modification is modified to update the input parameters as follows:

$m := m-(m*ss_m)$ $t := t-(t*ss_t)$ $S := S-(S*ss_S)$ $C := C-(C*ss_C)$ $nr_{max} := nr_{max}-(nr_{max}*ss_{nr_{max}})$ Intuitively, the minimum (maximum) threshold is relaxed to facilitate the procedure to satisfy it while, at the same time, more relaxed (tightened) other parameters are enforced to produce more (fewer) rules. This converges with the number of mined rules gradually increasing (decreasing) and the threshold on the number of rules gradually decreasing (increasing). By tuning the step size input parameters, it is possible to allow for a faster (or slower) convergence. Moreover, imposing non-zero step size parameters also allows one to specify which input parameters will be affected by the relaxation.

If the number or association rules produced $nr_{max} \leq |AR| \geq nr_{min}$, then the evaluation is considered successful (123) and the computation continues with the Rule Cleaning (130).

Non-Limiting Examples of Variations of Association Rules Mining (120)

This Section presents a non-limiting list of possible variations that can be applied to the Association Rules Mining (120).

Non-Limiting Examples of Variations of Mining (121)

Instead of using the classical notions for the values of support and confidence utilised during the mining of association rules, novel notions of fuzzy support and fuzzy confidence are here introduced and employed during the mining process.

To make use of the fuzzy extension of the association rule mining algorithms, the variation of Truth Degrees Removal must be used to preserve the truth values associated with specific attributes.

During the candidate frequent itemset generation phase, for each generated non-empty candidate itemset $AV=\{a_1(v_1), \ldots, a_k(v_k)\}$, where, for $1 \leq i \leq k$, $a_i \in A$ and $a_i$ is not a truth-value attribute, compute the support of AV as:

$$S(AV) = \frac{\sum_{r \in D, AV \subseteq r} (val(t_{a_1}, r) \odot \ldots \odot val(t_{a_k}, r))}{\text{number of all records in } D} \quad (4)$$

where $\odot$ is the t-norm specified in $M \in I$, $AV \subseteq r$ indicates that each element in the itemset AV is present in the tuple r, and $val(t_{a_j}, r)=1$ where $t_{a_j}$ is not specified for r.

Non-Limiting Examples of Variations of Mining Evaluation (122)

Instead of relaxing both the minimum number of rules $nr_{min}$ (or the maximum number of rules $nr_{max}$) and the other relevant parameters (m, M, S and C), relax only some of these parameters, or relax all but $nr_{min}$ and $nr_{max}$.

Another variation may require four additional parameters $m_{min}$, $M_{min}$, $S_{min}$, $C_{min}$ to be provided as part of the input I. Each of these parameters indicates a critical minimum threshold below which the parameters can not be lowered during the relaxation of parameters. This prevents borderline cases where meaningless rules would be produced after relaxations.

Rule Cleaning (130)

Figure 2:
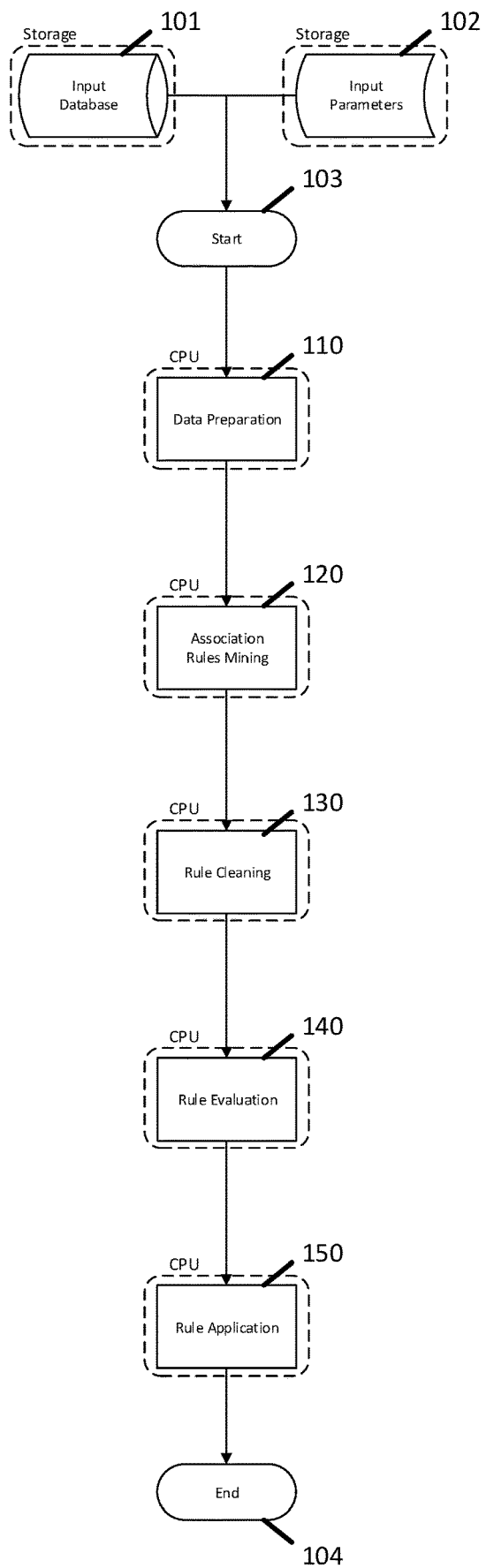
FIG. 2 is another flowchart according to an example of the instant disclosure.

As shown in FIGS. 1 and 2, support and confidence might be misleading metrics because they do not measure the real strength of the correlation and implication between the body and the head of an association rule. Therefore, the procedure also uses other metrics such as the Kulczynski measure (Kulc), calculated for each association rule ar as:

$$Kulc(ar) = \frac{1}{2}(P(body(ar)|head(ar)) + P(head(ar)|body(ar))) \quad (5)$$

and the Imbalance Ration (IR), calculated as:

$$IR(ar) = \frac{|S(body(ar)) - S(head(ar))|}{S(body(ar)) + S(head(ar)) - S(body(ar) \cup head(ar))} \quad (6)$$

to remove statistically irrelevant rules. If the two directional implications, i.e. body(ar) implies head(ar) and vice versa, have the same strength, then IR(ar) will be zero. Here, the strength of an implication is measured by how many times the implication is true in the database D. Otherwise, the larger the difference between the two directional implications, the larger the imbalance ratio. The Kulczynski measure represents the average of two conditional probabilities: the probability of itemset head(ar) given itemset body(ar), and the probability of itemset body(ar) given itemset head(ar). The conditional probabilities can be viewed as a confidence measure for the rule. The Imbalance Ratio is null-invariant as it is not affected by the number of null transactions and is independent of the total number of transactions. Let K and KIR be the minimum thresholds specified in I for the Kulczynski measure and the combination of the Kulczynski measure with the Imbalance Ratio, respectively. The best rules are those where either (i) Kulc(ar)>K and is thus close to 1 or (ii) Kulc(ar)≤K and 2*|0.5−Kulc(ar)*|IR(ar)>KIR. Note that the Rule Cleaning (130) carried out during this process is exemplary while different formulas for the combination of Kulc and IR can be devised. These different formulas would lead to minor variants, several of which can be meaningful in practice.

Non-Limiting Examples of Variations of Rule Cleaning (130)

This Section presents a non-limiting list of possible variations that can be applied to Rule Cleaning (130).

Instead of using the preferred metrics Kulc and IR, another example may include receiving as part of the input I (102) a set of functions together with the expected min or max value that each function should return when applied to an association rule and a database. The set of functions would be of the form $F=\{<f_1(ar, D), min/max>, \ldots, <f_n(ar, D), min/max>\}$, where min/max stands for an equation such as min=0.1 or max=0.9. Here some examples of evaluation functions (i.e. metrics) that can be used to score the quality of association rules are provided:

(i) lift, computed as $$lift(body, head) = \frac{P(body \cup head)}{P(body) * P(head)}.$$

A value of lift<1 indicates that the body is negatively correlated with the head of the rule, where a pair of set of attributes is said to be negatively correlated if the presence of one set implies that the other set will likely be absent. On the contrary, a value of lift>1 indicates a positive correlation. Finally, a value of lift=1 indicates an absence of correlation.

(ii) $\chi^2$, which makes use of a contingency table with observed and expected values that can be generated with standard techniques. $\chi^2$ can then be computed as $$\sum \frac{(observed - expected)^2}{expected}.$$

(iii) all confidence, computed as min{P(body|head), P(head|body)}. It represents the minimum confidence of the two association rules body→head and head→body. all confidence is influenced by the support of the body, the head and body U head but not by the total number of records.

(iv) max confidence, computed as max{P(body|head), P(head|body)}. It represents the maximum confidence of the two association rules body→head and head→body. max confidence is influenced by the support of the body, the head and body U head but not by the total number of records.

(v) cosine measure, computed as $\sqrt{P(body|head)*P(head|body)}$. It represents a harmonized lift value, that is influenced by the support of the body, the head and body∪head but not by the total number of records.

Note that the presented list is a non-limiting list of metrics that can be used to measure the statistical relevance of the produced association rules.

Rule Evaluation (140)

Crowd Verification Feasibility Constant (141)

As shown in FIGS. 1 and 6, calculate the amount cvf of association rules from AR to be evaluated by the (crowd of) domain experts involved in the evaluation of ARM(D, I). The throughput capacity that can be handled by the human component is indicated in the input parameter HITL (Human In The Loop).

If HITL<|AR|*l then set cvf=HITL. If |AR|≥HITL≥||AR|*l then set cvf=|AR|*l. Otherwise, if HITL≥|AR| then set cvf=|AR|.

Randomly select a set G⊆AR of cardinality cvf to be sent to the crowd.

Expert Selection (142)

Each time that an expert e reviews an association rule ar∈G of the form $a_1(v_1), \ldots, a_{n-1}(v_{n-1}) \rightarrow a_n(v_n)$, update E as the following:

(i) for each $a_i(v_i) \in$ ar, if the tuple (e, $a_i$, rev)∈$D_e$ then update it as (e, $a_i$, rev+$e_b$), where $1 \leq i \leq n-1$ and $e_b \in$ I is the relative importance assigned to revisions of body attributes of a rule. If (e, $a_i$, rev)∉$D_{ex}$ add (e, $a_i$, $e_b$) to E.

(ii) for $a_n(v_n) \in$ ar, if the tuple (e, $a_i$,rev)∈De then update it as (e, $a_i$, rev+$e_h$), where $e_h \in$ I is the relative importance assigned to revisions of head attributes of a rule. If (e, $a_i$, rev)∉$D_{ex}$ add (e, $a_i$, eh) to E.

In the following, an example of the database E is provided:

TABLE 9

Example database E containing information regarding the reviews performed by experts.

| expert_id | attribute | #reviews |
|---|---|---|
| 123456 | #employees | 20 |
| 123456 | income | 5 |
| 123457 | income | 30 |

For each association rule ar∈G and for each expert e identified by eid, compute a score s as follows:

$$s(eid, ar) = \sum_{\substack{(eid,attr,rev) \in E, \\ attr \in ar}} rev \quad (7)$$

Assign each ar∈G to an available expert e for evaluating ar based on domain expert knowledge, where e is identified by an expert identifier eid such that s(eid, ar) takes a maximum value when eid ranges over all available experts. If more than one such expert has the maximum value s(eid, ar), then choose one among them randomly. Moreover, if no ranking of the experts can be computed due to lack of data in E, then assign each ar∈G randomly. Considering the example database containing information regarding experts' reviews shown in Table 9, it is clear that the expert with associated id "123456" would be chosen for evaluating rules involving the attribute #employees, whereas the expert with associated id "123456" would be the preferred choice for rules involving the attribute income.

The system sends to each expert e the rules that have been assigned to e and awaits the rule evaluation feedback from e. If some e does not provide feedback within the timeout TO∈I, then e is marked unavailable, and a new expert assignment for the assigned association rule is computed by the above procedure. Each expert e, for each association rule ar assigned to e, will provide feedback in a message of the form: <e, ar,feed> where feed∈{true, false}. In this setting, feed=true indicates positive feedback for the rule ar and feed=false indicates negative feedback, meaning that the rule is not correct according to e's domain knowledge and their web searches.

Results Evaluation (143)

Once the feedback for each rule ar from the previous process has been received, the system aggregates them and computes the overall accuracy of the rule set G as follows:

$$accur(G) = \frac{\text{number of positive expert validations of rules in } G}{\text{number of all expert validations of rules in } G} \quad (8)$$

If accur(G)<p, where p is the desired minimum accuracy fraction indicated in I (102), then the evaluation is not considered successful (144). The computation restarts from the Uncertain Record Elimination (115) after performing a Parameter Modification over the input parameters as follows:

$$m := m - (m * ss_m)$$

$$t := t - (t * ss_t)$$

$$S := S - (S * ss_S)$$

$$C := C - (C * ss_C)$$

$$nr_{min} := nr_{min} - (nr_{min} * ss_{nr_{min}})$$

$$K := K + (K * ss_K)$$

$$KIR := KIR + (C * ss_{KIR})$$

$$p := p - (p * ss_p)$$

where each $ss_i \in$ SS is defined in I.

Otherwise, if accur(G)≥p the evaluation is considered successful (144) and the system continues its computations with Rule Application (150) as described further below.

Non-Limiting Examples of Variations of Rule Evaluation (140)

This Section presents a non-limiting list of possible variations that can be applied to Rule Evaluation (140).

Non-Limiting Examples of Variations of Crowd Verification Feasibility Constant (141)

A variation includes sending to an expert, together with an association rule ar, a non-empty list of records $R_{ar}$, where each record in $R_{ar}$ satisfies the conditions stated in body(ar), but violates the condition in head(ar)=a(v). Such a violation arises either because there is no value val(a,r) (for example, in a strictly relational database, indicated by the presence of a null value such as "NULL"), or because there is a value val(a,r)≠a(v). This allows the experts to verify, for example through web-searches, both the general validity of the rule and the specific application of the rule to real cases. Given the input parameters HITL and l, compute the amount cvf of association rules from AR that can be evaluated by the domain experts involved and the maximum cardinality of $R_{ar}$ as (i) if HITL<|AR|*l then set cvf=HITL and $|R_{ar}|=1$, (ii) if |AR|≥HITL≥|AR|*l then set cvf=|AR|*l and $$|R_{ar}| = \max\left\{\frac{HITL - cvf}{cvf}, 1\right\},$$

otherwise (iii) if HITL≥|AR| then set cvf=|AR| and $$|R_{ar}| = \max\left\{\frac{HITL - cvf}{cvf}, 1\right\}.$$

Randomly select a set G⊆AR of cardinality cvf. For each ar.

As another variation, the methodology may handle cases where the throughput capacity HITL of rules that can be checked by the humans involved in the process is unknown. In this case, the amount cvf of association rules may be given as input, together with the fraction of rules to be tested l. Randomly select a set G⊆AR of cardinality cvf to be sent to the crowd of experts. In this variation, it is not guaranteed that all the association rules of G will be verified. Rather, a best-effort approach may be carried on by the human component.

A further variation may require the additional input parameters support_verification_threshold∈ [0,1], confidence_verification_threshold∈ [0,1] and record_verification_threshold∈ [0, 1]. During the selection of the rules (and, possibly, records) to be sent to the experts, select only those rules ar (records r) for which:

S(AV)<support_verification_threshold,

C(AV)<confidence_verification_threshold, $t_r$<record_verification_threshold, where AV is a set containing both the ground atoms in the body and the head of ar. Thus, only the rules and records that do not fulfill the above criteria of trust will be sent to experts, whereas the remaining rules will be automatically trusted and enforced.

Non-Limiting Examples of Variations of Expert Selection (142)

For evaluating the association rules resulting from the Rule Cleaning (130) based on domain expert knowledge do the following. For grounded rules of G, instead of selecting experts (from the Human In The Loop team) based on their knowledge and/or previous performance, experts are selected randomly.

Non-Limiting Examples of Variations of Results Evaluation (143)

As a variation, the accuracy metric can be replaced with other known metrics to evaluate the rule set G.

Other variations include the specification of a rule evaluation strategy to handle user-specified policies. This means that not only rule sets but also single rules are evaluated and/or rated by experts. In case a single rule is evaluated by two or more experts, the rule evaluation strategy aggregates over these multiple evaluations and thus retains a single aggregate evaluation per rule.

In some examples, in the rule evaluation strategy, the rule set evaluation is actually mainly based on single-rule evaluations, while in other examples, the rule-set evaluation is replaced by the evaluation of single rules. Further examples of a possible rule evaluation strategy use single-rule evaluation as a supplementary feature, in addition to rule set evaluation.

When single rules are evaluated by experts, it makes sense to retain rules that are positively evaluated for further rounds of the computation. In what follows, a non-limiting example of a specific rule evaluation strategy that retains positively evaluated rules over several iterations of the procedure is described. For every evaluated association rule ar∈ G, compute the accuracy of ar as the following:

$$(ar) = \frac{\text{number of positive expert validations of } ar}{\text{number of all expert validations of } ar} \quad (9)$$

Depending on the evaluation of the rule set, the procedure then distinguishes two cases:

CASE 1: accur(G)<p, which means that the rule set evaluation is not successful, and the accuracy for a given rule ar is greater than a user-specified threshold, store ar in an ordered set RAR, with a descending order based on accur(ar). In this case, the subsequent iterations of the ARM(D, I) procedure start with AR:= AR∪RAR. In the case that at any point in the procedure |AR∪RAR|>$nr_{max}$, then association rules with lower accuracy values in RAR are dropped until RAR=0 or | AR∪RAR=$nr_{max}$.

CASE 2: accur(G)≥p, which means that the rule set evaluation is successful, then all the association rules ar∈ AR for which accur(ar) is below a user-specified threshold, are removed from G.

In other rule evaluation strategy examples, the set RAR might be exempted from the requirement to meet the upper bound on the number of association rules, i.e. only the set of association rule AR generated during the current iteration of the procedure will be accounted for the threshold $nr_{max}$.

Rule Compression

Here we introduce a methodology for creating a rule-forest structure that embeds all the association rules. The creation of the rule-forest structure is part of the Rule Evaluation 140 process. This factorizes common elements between separate association rules, producing a space-efficient structure. The produced rule-forest can be used by domain experts to get a broad yet compact overview of the association rules set and the discriminant between multiple association rules.

The computation performed by the system iterates over all the mined rules ar∈ AR to create a decision rule-forest structure forest(AR). Standard techniques to create decision trees from rules are utilised. The rules are divided into sets where there exists at least one ground atom that appears in the body of every rule in the set. For example, considering the set of rules 800 in FIG. 8, the rules can be divided into two sets: one containing the rules 801 and 802 and the other containing the rules 803 and 804.

Figure 8:
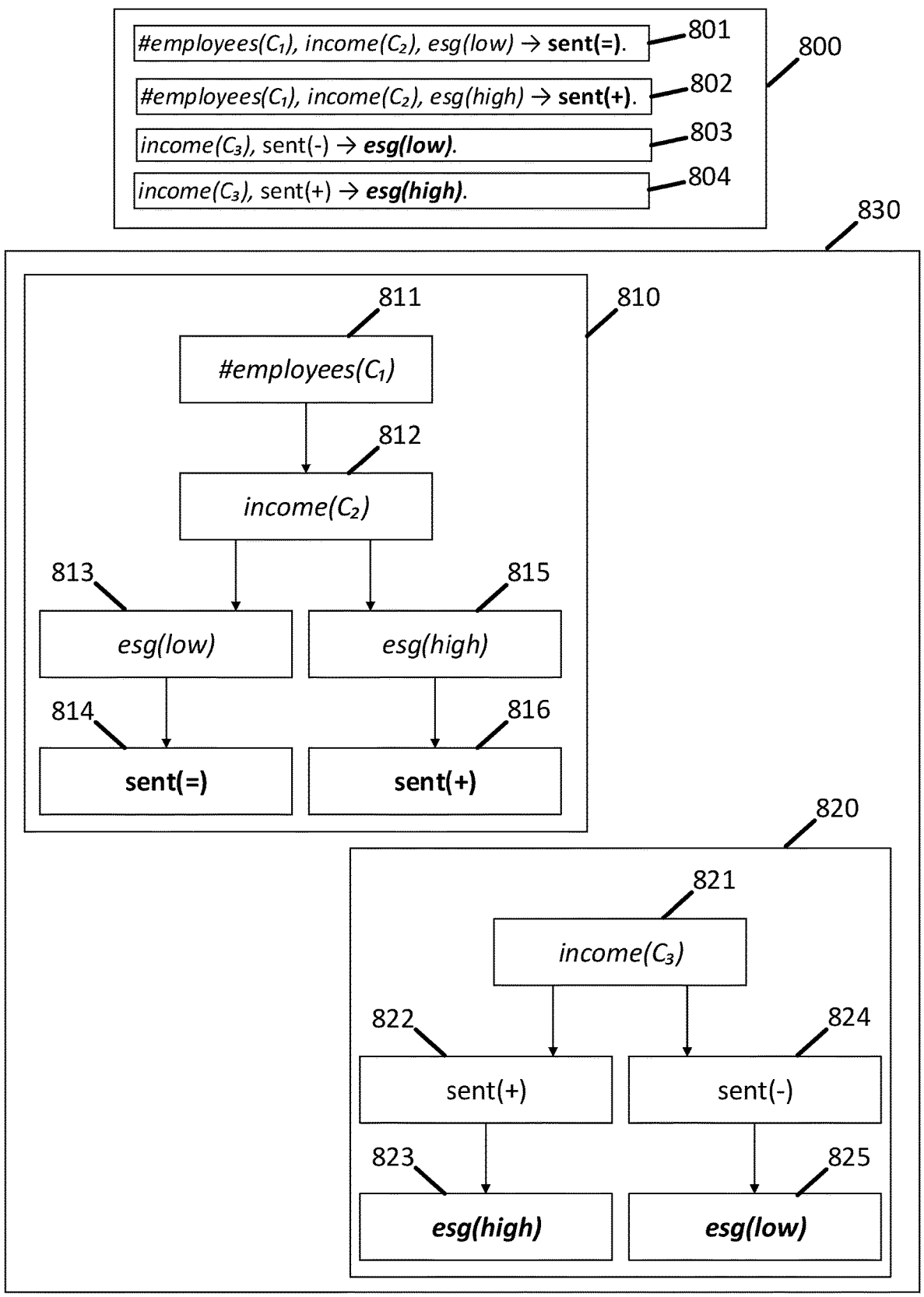
FIG. 8 is an example including two rule-trees which, together, constitute a rule-forest according to an example of the instant disclosure. The rule-trees are generated from a set of association rules.

A decision rule-tree is created for each set sr where each node of the tree is composed of a ground atom appearing in the bodies of the association rules in sr and each leaf is composed of a ground atom appearing in the heads of the association rules in sr. FIG. 8 shows an example of the creation of a rule-forest structure (830) starting from a given set of rules (800). The rule-forest is composed of two distinct rule-trees (810 and 820).

In order to create the rule-tree 810, the rules shown in the elements 801 and 802 are utilised. First, the common body atom #employees($C_1$) is utilised to create the node 811. Then, since also the second ground atom in the body income($C_2$) is shared, this is used to create the node 812 connected via a direct arc from 811. Given that there is no other common ground atom between the considered rules, the rest of the ground atoms in the body are mapped to elements on separate directed paths originating from 812. Therefore, two different elements, 813 and 815 containing, respectively, the ground atoms esg(low) and esg(high) are created. Finally, the ground atoms in the heads of, respectively, 801 and 802 are used to create the leaves 814, with a direct path from 813, and 816, with a direct path from 815, containing the ground atoms sent(=) and sent(+). Note that both the head of the rules and the text in the leaves are in bold text to highlight that they refer to the same concept, i.e. the consequent of a rule. Likewise to the creation of rule-tree 810, the rule-tree 820 is constructed by using the rules in 803 and 804. The node 821 corresponds to the first body atom income($C_3$) of both 803 and 804. The nodes 822 and 824 represent the second body atom sent(+) and sent(−) of, respectively, 804 and 803. Since 822 and 824 are not equal, two different directed paths are started from 821 connecting to them. Finally, 823 and 825 represent, respectively, the body heads of 804 (esg(high)) and 803 (esg(low)). 823 is connected to a directed arc originating in 822, while 825 is connected to a directed arc originating in 824. Together, rule-trees 810 and 820, constitute the rule-forest 830.

Each directed path from the root of a rule-tree to a leaf constitutes an association rule. In the same rule-tree, different root-leaf paths necessarily contain different nodes corresponding to different ground atoms in the relative association rules. These ground atoms are the discriminants that the association rules use to make different predictions.

Several algorithms and optimizations for constructing forest(AR) may be used in different iterations and/or in different variations of the procedure, leading to the construction of different rule-forests even in the presence of the same set of association rules.

Rule-Forest Integrity Check

The procedure, within the context of the Rule Evaluation 140 process, sends the decision rule-forest structure forest (AR) computed during the Rule Compression to an appropriate subset of the available experts in the Human In The Loop team for an integrity check of the overall program. A consensus algorithm is run amongst the experts involved, to find an agreement. If a positive consensus is not reached, which indicates that possibly forest(AR) badly represents the application domain, the computation is restarted from Uncertain Record Elimination (115), where a Parameter Modification over the input parameters is performed as follows:

$m := m - (m * ss_m)$ $t := t - (t * ss_t)$ $S := S - (S * ss_S)$ $C := C - (C * ss_C)$ $nr_{min} := nr_{min} - (nr_{min} * ss_{nr_{min}})$ $K := K + (K * ss_K)$ $KIR := KIR + (C * ss_{KIR})$ $p := p - (p * ss_p)$ In case a positive consensus is reached, the process continues.

A large number of alternatives are possible and may or may not be appropriate in various application contexts. For example, in some contexts, it may be useful to increment or decrement the parameter l, too.

Rule Application (150)

Figure 7:
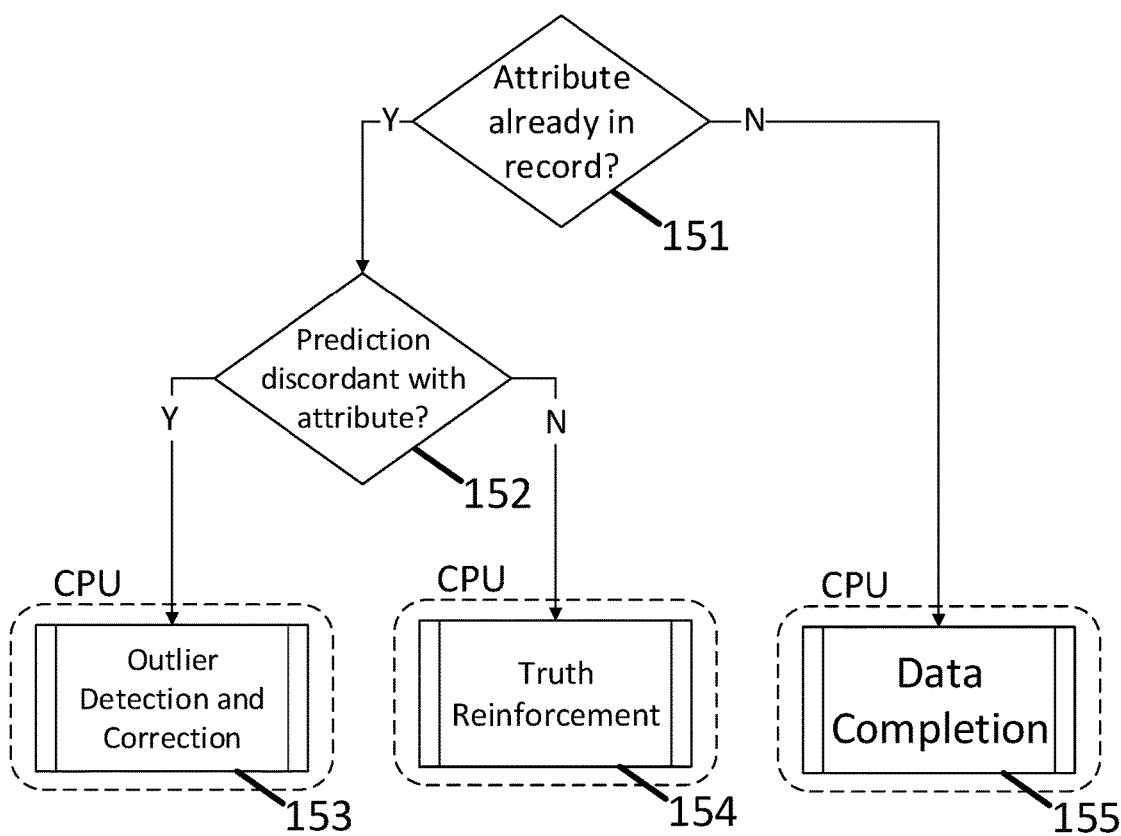
FIG. 7 depicts the subprocesses according to an example of the instant disclosure.

As shown in FIGS. 1, 2, and 7, the set of mined association rules AR is used to improve the quality of the original database $D_0$ (101). For each ground atom a(v) inferred by the application of an association rule ar (i.e. a(v)=head(ar)) to a record r∈ $D_0$, perform one of the following:

(i) If the record r used for the association rule ar contains a conflicting value val(a, r)≠a(v) (151 and 152), then Outlier Detection and Correction (153) is performed to correct r.

(ii) If the record r used for the association rule ar contains a concordant value val(a, r)=a(v) (151 and 152) and val($t_a$, r)≠1, then Truth Reinforcement (154) may be performed to reinforce the truth value of a in r. If val($t_a$, r)=1, nothing is performed to preserve original ground knowledge.

(iii) Otherwise, if r contains a null value for val(a, r) (151), then perform Data Completion (154) to complete r.

The above-mentioned processes are now described in somewhat more detail.

Outlier Detection and Correction (153)

For each association rule ar∈ AR of the form shown in Equation 1, find all the records r∈ $D_0$ such that body(ar)∈ r and head(ar)=a(v) and such that val(a,r)≠a(v) and val(a,r) ≠NULL (151 and 152). The procedure performs the following updates: val(a, r):=a(v) and val($t_a$, r):=C(ar).

Truth Reinforcement (154)

For each association rule ar∈ AR of the form shown in Equation 1, find all the records r∈ $D_0$ such that body(ar)∈ r and head(ar)=a(v) and such that val(a, r)=a(v) and val($t_a$, r)≠1 (151 and 152). The procedure performs the following update:

$$val(t_a, r) := \max\left\{ \frac{tr_{old} * val(t_a, r) + tr_{new} * C(ar)}{tr_{old} + tr_{new}}, val(t_a, r) \right\}, \quad (10)$$

where C(ar) is the fraction expressing confidence of ar, $tr_{old}$ and $tr_{new}$ are the weights indicated in I (102) to balance the update.

Data Completion (155)

For each association rule ar∈ AR of the form shown in Equation 1, find all the records r∈ $D_0$ such that body(ar)∈ r and head(ar)=a(v) and such that val(a,r) is not defined or contains a null value (151). Then, the procedure performs the following update: val(a, r):=a(v).

Non-Limiting Examples of Variations of Rule Application (150)

This Section presents a non-limiting list of possible variations that can be applied to the Rule Application (150).

Variations of Outlier Detection and Correction (153)

For each association rule ar∈ AR of the form shown in Equation 1, find all the records r∈ $D_0$ such that body(ar)∈ r and head(ar)=a(v) and such that val(a, r)≠a(v) and val(a, r)≠NULL. The procedure, instead of overwriting the original attribute value, adds a new column (if not already present) a_corrected to $D_0$ (101) and performs the following update: val(a_corrected,r):=a(v).

In other examples, a column $t_a$ is added to $D_0$, if it is not already present. The $t_a$-value of a record r can be computed as a (possibly weighted) combination of other truth values and parameters.

Non-Limiting Examples of Variations of Truth Reinforcement (154)

For each association rule ar∈ AR of the form shown in Equation 1, find all the records r∈ $D_0$ such that body(ar)∈ r and head(ar)=a(v) and such that val(a, r)=a(v) and val($t_a$, r)≠1. Instead of performing the update as indicated herein, using the original truth value val($t_a$,r) and the confidence of the association rule ar, the method may consider a different combination of metrics for the update, such as, for example, a weighted combination of confidence, support, Kulc, IR, and val($t_a$, r).

Non-Limiting Examples of Variations of Data Completion (155)

For each association rule ar∈ AR of the form shown in Equation 1, find all the records r∈$D_0$ such that body(ar)∈ r and head(ar)=a(v) and such that val(a, r) is not defined or contains a null value. The procedure, instead of overwriting the original attribute value, adds a new column (if not already present) a_inferred to $D_0$ (101) and performs the following update: val(a_inferred,r):=a(v).

Introduction of an Additional Explainability Feature

When performing one of the subprocesses of Rule Application (150), the records in the database $D_0$ (101) may be further enhanced with an explanation ex relative to the inferred data. This can be performed by introducing a new column with a fresh attribute name expl_a in $D_0$, where a is the attribute which expl_a provides an explanation of. Given the completion val(a, r)=a(v) made by rule ar over the record r, write an explanation for the completion in the column expl_a using the values of body(ar) together with the quality metrics computed during ARM(D, I), such as support, confidence, Kulc, IR and accuracy. For example, given an association rule ar=#employees($C_i$), income($C_j$)→esg(low), with associated metrics S(ar)=0.2, C(ar)=0.8, Kulc=0.95, IR=0.5, accur=0.8, where #employees and income use generic indexes to keep the example more abstract, the content of val(expl_a, r) for a record r may, for example, look as follows:

"The value of esg for the record r has been predicted as low, given that (i) the value of #employees is equal to $C_i$, (ii) the value of income is equal to $C_j$, (iii) the rule ar is #employees($C_i$), income($C_j$)→esg(low) and (iv) the metrics associated to ar are: S(ar)=0.2, C(ar)=0.9, Kulc(ar)=0.95, IR(ar)=0.5, accur=0.8."

Introduction of an Additional Fuzzy Feature

Another variation extends the above described enhanced explanation by a truth value val($t_a$, r) for the predicted value val(a, r), where a∈ head(ar). In this variation, the input I (102) contains, as an additional parameter, a weight $w_m$∈ [0, 1] associated to each metric m. The value for val($t_a$, r) is based on the support S, confidence C, Kulczynski measure Kulc, imbalance ratio IR and accur p, and is computed as follows:

$$val(t_a, r) = \frac{(S * w_S) + (C * w_C) + (Kulc * w_{Kulc}) + (IR * w_{IR}) + (p * w_p)}{w_S + w_C + w_{Kulc} + w_{IR} + w_p}. \quad (11)$$

In other variations, other metrics and methods of other methods of aggregating those metrics might be used, for example, a weighted combination of t-norms may be used for the aggregation.

Introduction of an Additional Usability Feature

Let D' be a database that is different from $D_0$ (101) and unrelated to ARM(D, I), yet still having the same schema as A or a schema compatible with A. The application of the mined association rules AR during Rule Application (150) can be performed over D' to reuse the knowledge mined from $D_0$.

Introduction of an Additional Optimization

Instead of applying the mined association rules one at a time, the rule-trees in forest(AR) may be used for faster computation, reducing the overall amount of comparisons between rule bodies and records.

Introduction of a Variation for Multiple Procedures: Parameter Modification

As another example, upon violation of the quality thresholds indicated in the input such as, for example, $nr_{min}$ or p, may perform the following. Instead of relaxing all the input parameters at once before restarting the computation, undertake a more flexible approach than the one described in Mining Evaluation (122), Results Evaluation (143) and Rule-Forest Integrity Check, as explained below.

The required Parameter Modification may be performed in a Gradient Descent fashion by first probing and then relaxing one input parameter at a time. This input parameter is chosen amongst the ones responsible for the failure to reach the threshold requirements, i.e. those parameters already mentioned in the Modification. The relaxation that during the test shows the best improvements is then applied. This is repeated until all the thresholds are satisfied.

Extensions, Refinements, Variations and Alternatives

The above-disclosed process ARM(D, I) has been presented as an example, together with some alternative processes. Some of the processes, introduced are purposely based on arbitrary algorithmic, input and data structures used to present a practical yet general enough picture of the overall methodology.

Main Principles and Possible Variations of ARM(D, I)

The underlying principles of the process ARM(D, I) can be abstractly summarized as follows:

(i) The data in the target database D are prepared for effective and efficient mining. This includes, where appropriate, the removal of all the columns in D which would have brought no benefit to the mining of association rules. Moreover, where D contains non-crisp truth values, minimum thresholds on attribute-level and record-level are applied. In the eventuality that the columns in D contain truth degrees referring to either the records in D or other columns in D and these truth degrees are not utilised in later processes, they are also removed.

(ii) The data in D are utilised to mine frequent itemsets from each of which several association rules are generated. Both the frequent itemsets and the association rules are subject to minimum values thresholding of, respectively, support and confidence to ensure a high quality of the generated rules. Moreover, the volume of the association rules generated is controlled by means of minimum and maximum target values. Optionally, the truth values of the columns in D are exploited during the mining process to obtain more accurate resulting rules.

(iii) The computed association rules AR are subject to statistical relevance tests to further assess their quality. This is carried on by computing a combination of metrics based on AR and D. These metrics are then used to filter out low-quality rules from AR.

(iv) Optionally, where a set of domain experts is available, the association rules AR are evaluated by a crowd of experts. Several methods to determine the number of rules and the selection of the expert reviewing such rules are employed. A metric to aggregate and decide the success of the human evaluation is computed.

(v) An optional decision-tree-like structure is created from the association rules AR and is examined by the crowd of experts as an ulterior quality check.

(vi) The association rules AR are employed in several tasks to improve the quality of the original database $D_0$ and/or of a database D', unrelated to ARM(D,I), with a schema equivalent to the schema of $D_0$.

(vii) Several mechanisms to automatically halt the computation and/or restart it with an automatically adjusted set of input parameters are utilised.

Some of the processes shown herein are not strictly necessary for the termination of the procedure and the computation of association rules. For example, excluding Symmetric Functional Dependencies Removal (112) and/or Uninteresting Attribute Removal (113) may allow the termination of the process, possibly with some inefficiencies. Likewise for Attribute Discretization (114), with the difference that the inefficiencies introduced by the removal of Attribute Discretization would be so strong to prevent most of the computations to end in a reasonable time. The subprocesses Uncertain Record Elimination (115) and Record t-Fuzzification (116) are needed only in the eventuality that the database contains fuzzy data. Though the fuzziness of the data could be ignored and an approximated computation could be performed, making use of Truth Degrees Removal (117) to remove the undesired truth values and sacrificing the accuracy of the results produced. The subprocess of Mining Evaluation (122) could be optionally removed, likewise with the Rule Cleaning (130) and the whole process of Rule Evaluation (140). This would drastically reduce the quality of the results obtained by the process Rule Application (150) in favour of a lighter computation.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of association-rule based data outlier detection and data completion, the method comprising accessing from storage media by at least one processor data comprising:

an input database $D_0$ comprising a single relational table over a schema $A_0$ of attributes, where $A_0$ comprises a non-empty set of regular attributes $A_0^r$, and for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters, the method further comprising:

(i) making, by the at least one processor, a copy D of the input database $D_0$, where Ds schema A is initially identical to $A_0$, the method henceforth operating on the database D, and, guided by the input parameters;

(ii) data preparation eliminating, by the at least one processor, attributes from A that are deemed irrelevant to the mining, and eliminating corresponding columns from D, eliminating from D records whose aggregate fuzzy truth value is below a constant specified in the input I to improve computational efficiency, and performing, guided by input parameters, discretizations of domains and data values of certain attributes;

(iii) association rules mining, by the at least one processor, applied to D, which generates a set of association rules for D, and which to each generated association rule ar computes and associates a support S(ar) and a confidence C(ar);

(iv) rule cleaning by (a) identifying, by the at least one processor, some of the association rules in the set of association rules generated by the association rules mining as statistically insignificant rules and (b) eliminating, by the at least one processor, the statistically insignificant rules from the set of association rules generated by the association rules mining;

(v) rule evaluation, by the at least one processor, whereby subsets of the set of association rules obtained by association rule mining are selected and evaluations of one or more of the subsets are obtained by domain experts; and (vi) rule application including performing, by the at least one processor, (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

2. The method of claim 1, where the data preparation comprises:

(i) attribute filtering, eliminating attributes x from A and corresponding columns from D, where x is recognized to be redundant based on symmetric functional dependencies present in, or derived from, the input FD-cover, or where x is an element of a set of uninteresting attributes provided as an input parameter;

(ii) attribute discretization, whereby, for selected single attributes a having a large linearly ordered active domain (comprising a number of values occurring in the column corresponding to a, where the values are ordered according to a total order comprising "≤"), the attribute domain is replaced by a smaller domain comprising intervals of the original domain, and each value v in the column corresponding to a is replaced by the interval to which v pertains, (iii) uncertain record elimination, whereby records of D of which at least one component associated with a truth value that is less than a threshold given as input parameter are eliminated from D;

(iv) record t-fuzzification, whereby records are eliminated having an aggregate fuzzy truth value computed according to a t-norm given as an input parameter is below a threshold indicated by an input parameter; and (v) truth-degree attribute removal, whereby, after having finished performing (i)-(iv), all truth value attributes are eliminated from A and respective columns are eliminated from D.

3. The method of claim 2, where, for at least one attribute a from A, in case a is selected for attribute discretization, the attribute discretization comprises a mechanism for changing the truth values of the $t_a$-components of the tuples of the database D.

4. The method of claim 2, where the record t-fuzzification (iv), comprises representing an approximate aggregate truth value of each record through record repetitions in such manner that each record is repeated in the database D a number of times that is approximately proportional to the aggregate fuzzy value, whereby, even after a subsequent truth-degree attribute removal, approximate aggregate fuzzy values of records remain implicitly available as record repetitions and directly influence the association rules mining.

5. The method of claim 1, where the association rules mining comprises:

(i) executing a standard association rules mining algorithm guided by input parameters from I, the rule-mining generating from the database D association rules over A, and computing with each such association rule ar its support S(ar) and confidence C(ar); and (ii) mining evaluation that, in case the number of rules generated is outside boundaries imposed by input parameters, relaxes or tightens at least one input parameter in order to obtain a set of mined rules having a cardinality that better fits cardinality constraints imposed by the input parameters, and re-starts the mining with the new parameters, and repeats until either a number of mined rules lies inside the boundaries imposed by input parameters, or until an abort criterion is satisfied, in which case the association rules mining outputs that no suitable association rule set could be found.

6. The method of claim 5 wherein the standard rules mining comprises one of:

(i) the Apriori algorithm,
(ii) the FP-growth algorithm,
(iii) the Eclat algorithm, and
(iv) further standard algorithms for mining association rules based on frequent itemsets.

7. The method of claim 5 wherein (i) each generated association rule ar is of the form body(ar)→head(ar), where body(ar) is a conjunction denoted as a comma-separated list of ground atoms, each ground atom of the form a(v), where a is some attribute from A and v is a data value, and where head(ar) is a single ground atom of this form, and where a record r contains a ground atom a(v) if the a-component of r has value v, (ii) one of:

(a) for each generated association rule ar, its support S(ar) is calculated as the division of the number of records in D containing all ground atoms appearing in ar by the number of records in D, and (b) for each generated association rule ar, its support S(ar) is calculated by the formula $$S(ar) = \frac{\sum_{r \in D, AV \subseteq r} (val(t_{a_1}, r) \odot ... \odot val(t_{a_k}, r))}{\text{number of all records in } D} \quad (12)$$

where AV is the itemset containing all ground atoms appearing in the head or body of ar, $\odot$ is a t-norm specified in the set I of input parameters, and "$r \in D, AV \subseteq r$" indicates that summation is only over tuples r of the database D that contain each ground atom of the itemset AV, and where val($t_{a_j}$, r) is the fuzzy value of the $a_j$-component of r, if the set of attributes A contains an attribute $t_{a_j}$, and val($t_{a_j}$, r)=1 otherwise, (iii) for each generated association rule ar and an associated confidence C(ar) computed as S(ar) divided by the number of records containing all ground atoms of body(ar), (iv) The set I contains a subset I* of numerical parameters, comprising:

m: a threshold constant from the interval [0, 1] indicating that any record r of D having a component with a truth value is less than m should be excluded from the association rules mining, t: a threshold constant from the interval [0, 1], indicating that each record r of D whose aggregate truth value (computed from the truth values of the components of r according to the t-norm τ provided in the input I) is less than t should be excluded from the association rules mining, S: a support cutoff constant from the interval (0, 1], indicating that only mined rules with support at least S should be retained by the association rules mining, C: a confidence cutoff constant from the interval (0, 1], indicating that only mined rules whose confidence is at least C should be retained by the association rules mining, $nr_{min}$: a positive integer indicating a desired lower bound on the number of association rules output by the association rules mining, $nr_{max}$: a positive integer indicating a desired upper bound on the number of association rules output by the association rules mining, and moreover: for each parameter X in I*, a "step size" $ss_X$ indicating a value used for stepwise relaxing or tightening the value of X in order to improve the cardinality of the rule set output by the association rules mining with respect to the lower bound $nr_{min}$ and the upper bound $nr_{max}$, and (v) in order to obtain a set of association rules where the cardinality of the [$nr_{min}$, $nr_{max}$], an iterative computation is performed whereby parameters from I* are step-wise either relaxed (in case of too few generated association rules) or tightened, and whereby, a new set of rules is computed, until an association rule set having a cardinality that lies in the interval [$nr_{min}$, $nr_{max}$] is found and output, or until an abort criterion is satisfied, in which case the association rules mining outputs that no suitable association rule set could be found.

8. The method of claim 7 where the (ii) comprises one of:
(i) when generating a number of rules less than $nr_{min}$, the input database D is the database D' obtained from $D_0$ after having applied the attribute filtering and the attribute discretization, and
(ii) when generating a number of rules larger than $nr_{max}$, the input database D in a current step is the input database D used in a previous step.

9. The method of claim 7 where, whenever at some step a number nr of rules is generated such that nr is outside the interval [$nr_{min}$, $nr_{max}$], then a next step performs the following adjustments for parameters to be relaxed or tightened:
(i) if $nr<nr_{min}$ and a parameter X from I*, where X is different from $nr_{min}$ is relaxed, then this parameter relaxation is actuated by the assignment X:=X*(1−$ss_X$), or, equivalently, by the assignment X:=X−(X*$ss_X$),
(ii) if $nr<nr_{min}$ and the parameter $nr_{min}$ is relaxed, then the relaxation is actuated by the assignment $nr_{min}$:=$nr_{min}$*(1−$ss_{nr_{min}}$), or equivalently by the assignment $nr_{min}$:=$nr_{min}$−($nr_{min}$*$ss_{nr_{min}}$), and
(iii) if $nr>nr_{max}$ and a parameter X from I*, where X is different from $nr_{max}$ is tightened, then this parameter tightening is actuated by the assignment X:=X*(1+$ss_X$), or equivalently by the assignment X:=X+(X*$ss_X$), and
(iv) if $nr>nr_{max}$ and the parameter $nr_{max}$ is tightened, then parameter tightening is actuated by the assignment $nr_{max}$:=$nr_{max}$*(1+$ss_{nr_{max}}$), or equivalently by the assignment $nr_{max}$:=$nr_{max}$+($nr_{min}$*$ss_{nr_{max}}$).

10. The method of claim 7, where, whenever parameters from I* are considered for relaxation or tightening, the parameters comprise one of the following subsets Sub of I*:
(i) {m, t, S, C} or any nonempty proper subset thereof,
(ii) {m, t, S, C, $nr_{min}$},
(iii) {m, t, S, C, $nr_{min}$} in case of relaxation,
(iv) {m, t, S, C, $nr_{max}$} in case of tightening, and
(v) {m, t, S, C, $nr_{min}$ $nr_{max}$}.

11. The method of claim 10, where, at each step of the iterative computation, the tightening or relaxation of the parameters in Sub is processed by one of:
(i) each parameter in Sub is either tightened or relaxed; and
(ii) by probing, testing, or other means, a single parameter of Sub is determined such that the rule mining after relaxing or tightening of the single parameter produces, or is expected to produce, a new association rule set that represents a best improvement to the previous rule set according to some given fitting criterion.

12. The method of claim 11, where the tightening or relaxation of the parameters in Sub is processed according to (ii), and where a gradient descent method is used for determining the single parameter of Sub.

13. The method of claim 1 where the rule evaluation comprises subsets of the set AR of generated association rules are sent to one or more experts for evaluation, and evaluations from a subset of the one or more experts are received:
(i) depending on a current workload of the experts, a subset G of the generated association rules is chosen as follows: (a) if it is practicable to evaluate all rules of AR, then G=AR, (b) if an evaluation of the entire set AR is impracticable, G is a chosen proper subset of AR;
(ii) the domain experts for the evaluation of the rule set G are automatically chosen based on stored data about experts' domain knowledge related to attributes of a given rule and based on individual workload;
(iii) based on the rule evaluations, an accuracy score accur(G) for the set G of rules to be evaluated is computed;
(iv) a parameter p is given in the set I of input parameters, and
(a) if accur(G)<p, then the evaluation of G yields "negative" (i.e., non-successful), and
(b) if accur(G)≥p, then the evaluation of G yields "positive" (i.e., successful),
(v) if the evaluation of the rule set G sent to experts is negative, the generated rules are rejected and, unless an abortion criterion applies, appropriate parameter modifications (relaxations or tightenings) are performed, and the rule mining restarts with the modified parameters;
(vi) if before one or more repetitions of the rule mining, cleaning, and evaluation an abortion condition applies, the user is informed that no suitable association rule set could be found; and
(vii) if the rule evaluation is successful, then the method proceeds with the rule application.

14. The method of claim 13 wherein, in case it is not practicable to evaluate all rules of AR, then G is a subset of AR having elements that are randomly chosen among the association rules in AR.

15. The method of claim 13, wherein each association rule to be evaluated by an expert is evaluated by an expert by classifying the rule either as "positive" or as "negative", and one of:
(i) accur(G) is computed as the number of positive association rule evaluations divided by a number of all association rule evaluations, and
(ii) for each association rule ar of G,
(a) a unique aggregate evaluation value accur(ar) is computed as the number of positive expert validations of ar divided by the number of all expert validations of ar, and
(b) there is a threshold value θ given as input parameter in I, and ar is "rejected" if accur(ar)<θ and ar is "accepted" if accur(ar)≥θ,
and accur(G) is computed as the number of accepted association rules from G divided by the number of all association rules in G.

16. The method of claim 13, where the rule evaluation further comprises
(i) the evaluation, by each expert who is sent a rule set, of each single association rule ar of this rule set, and
(ii) providing a unique aggregate evaluation value accur (ar) referred to as "accuracy" to each association rule ar under consideration whereby, when two or more experts evaluate the same association rule, the multiple evaluations for this association rule are aggregated to a single value.

17. The method of claim 16, wherein experts classify association rules positively or negatively, and where accur (ar) is computed as a number of positive expert evaluations divided by the number of all expert evaluations of ar.

18. The method of claim 16, where a threshold value θ is given as input parameter in I, and where each evaluated association rule ar is "rejected" if accur(ar)<θ and is "accepted" if accur(ar)≥θ, and where one of
(i) if accur(G)<p, all accepted association rules are inserted into an ordered set RAR of rules, ordered by descending accuracy, and when a new rule set AR is mined, rules from RAR are inserted into AR, starting with rules from RAR with highest accuracy and proceeding according to decreasing accuracy, until the cardinality of AR has reached $nr_{max}$ or all rules of RAR have already been inserted into AR, and (ii) if accur(G)≥p, then all rejected rules are eliminated from AR, and when AR has less than $nr_{max}$, rules from RAR are inserted into AR, starting with the rules from RAR with highest accuracy and proceeding according to decreasing accuracy, until the cardinality of AR has reached $nr_{max}$ or all rules of RAR have already been inserted into AR.

19. The method of claim 1 where the corrections and updates to database D performed by the rule application are incorporated into the input database $D_0$.

20. The method of claim 1 further comprising rule compression whereby generated association rules that are retained after cleaning and evaluation are transformed into a decision rule-forest comprising one or more decision rule-trees whereby rules are compactly represented and are applied via fast decision-tree-based methods.

21. The method of claim 20 where the decision rule-forest is sent for a rule-forest integrity check, after which either (i) the decision rule-tree is accepted and retained, or (ii) the decision rule-tree and the mined association rules are rejected, and unless a termination condition is met, the rule mining followed by compression restarts with automatically modified input parameters.

22. The method of claim 19 further comprising a feature of explanation, whereby, after rule application, explanations for data items are generated, stored, and made accessible to users.

23. The method of claim 22 where the explanations are made accessible to users by adding extra columns $expl_a$ containing explanations to the database $D_0$, where each such extra column $expl_a$ is related to an original attribute a of $D_0$ and stores, for tuples of D whose a-value was updated, textual explanations for the new a-values, the textual explanations allowing a user to comprehend which rules were applied and how the a-values were derived.

24. A system for association-rule based data outlier detection and data completion, the system comprising: at least one processor to access from storage media data comprising:
an input database $D_0$ comprising a single relational table over a schema $A_0$ of attributes, where $A_0$ comprises a non-empty set of regular attributes $A_0^r$, and
for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and
a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters,
the at least one processor further to:
(i) make a copy D of the input database $D_0$, where D's schema A is initially identical to $A_0$, the method henceforth operating on the database D, and, guided by the input parameters;
(ii) data preparation to eliminate attributes from A that are deemed irrelevant to the mining, and eliminate corresponding columns from D, eliminating from D records whose aggregate fuzzy truth value is below a constant specified in the input I to improve computational efficiency, and perform, guided by input parameters, discretizations of domains and data values of certain attributes;
(iii) association rules to mine applied to D, which generates a set of association rules for D, and which to each generated association rule ar computes and associates a support S(ar) and a confidence C(ar);
(iv) rule cleaning by (a) identifying some of the association rules in the set of association rules generated by the association rules mining as statistically insignificant rules and (b) eliminating the statistically insignificant rules from the set of association rules generated by the association rules mining;
(v) rule evaluation, whereby subsets of the set of association rules obtained by association rule mining are selected and evaluations of one or more of the subsets are obtained by domain experts; and
(vi) rule application including to perform (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

25. A non-transitory computer-readable storage medium comprising instructions stored thereon that, when executed by a computing device cause the computing device to perform operations comprising association-rule-based data outlier detection and data completion, the operations comprising:
accessing from storage media data comprising:
an input database $D_0$ comprising a single relational table over a schema $A_0$ of attributes, where $A_0$ comprises a non-empty set of regular attributes $A_0^r$, and for each attribute a of a selection of zero or more attributes from $A_0^r$, $A_0$ also includes a truth-value attribute coupled to a, referred to as $t_a$, ranging over a closed interval [0,1] of rational numbers, such that each data value stored in the a-component of each tuple t of $D_0$ is associated with a truth value stored in the $t_a$-component of t, and where data values in columns corresponding to attributes not coupled with a truth-value attribute are, by default, associated with a truth value 1, and
a set I of input parameters comprising a set of non-trivial functional dependencies (FD cover) valid on $D_0$ and to logically entail all functional dependencies to hold in $D_0$ and in all possible evolutions of $D_0$, and further comprising a number of other input parameters,
the operations further comprising:
(i) making a copy D of the input database $D_0$, where D's schema A is initially identical to $A_0$, the method henceforth operating on the database D, and, guided by the input parameters;
(ii) data preparation eliminating attributes from A that are deemed irrelevant to the mining, and eliminating corresponding columns from D,
eliminating from D records whose aggregate fuzzy truth value is below a constant specified in the input I to improve computational efficiency, and performing, guided by input parameters, discretizations of domains and data values of certain attributes;
(iii) association rules mining applied to D, which generates a set of association rules for D, and which to each generated association rule ar computes and associates a support S(ar) and a confidence C(ar);

(iv) rule cleaning by (a) identifying some of the association rules in the set of association rules generated by the association rules mining as statistically insignificant rules and (b) eliminating the statistically insignificant rules from the set of association rules generated by the association rules mining;

(v) rule evaluation, whereby subsets of the set of association rules obtained by association rule mining are selected and evaluations of one or more of the subsets are obtained by domain experts; and (vi) rule application including performing (a) outlier detection by identifying records and attribute values that violate one or more association rules, and that corrects the records, and (b) truth reinforcement, comprising raising the truth value, in case the truth value is less than 1, of data values in D that concord with values predicted by applicable association rules, and (c) data completion whereby null values are replaced by values predicted by the association rules.

* * * * *